United States Patent
Khoshnevisan et al.

(10) Patent No.: US 11,758,514 B2
(45) Date of Patent: Sep. 12, 2023

(54) PHYSICAL DOWNLINK CONTROL CHANNEL CANDIDATES RELATED TO PHYSICAL DOWNLINK CONTROL CHANNEL REPETITIONS

(71) Applicant: QUALCOMM Incorporated, San Diego, CA (US)

(72) Inventors: Mostafa Khoshnevisan, San Diego, CA (US); Xiaoxia Zhang, San Diego, CA (US); Tao Luo, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/085,789

(22) Filed: Oct. 30, 2020

(65) Prior Publication Data

US 2021/0195559 A1    Jun. 24, 2021

Related U.S. Application Data

(60) Provisional application No. 62/952,211, filed on Dec. 20, 2019.

(51) Int. Cl.
*H04W 72/02* (2009.01)
*H04L 1/00* (2006.01)
(Continued)

(52) U.S. Cl.
CPC ........... *H04W 72/02* (2013.01); *H04L 1/0038* (2013.01); *H04W 24/08* (2013.01);
(Continued)

(58) Field of Classification Search
CPC ....... H04L 1/0038; H04L 1/0045; H04L 1/08; H04L 1/1854; H04L 5/0053;
(Continued)

(56) References Cited

U.S. PATENT DOCUMENTS

| 8,755,348 B2 * | 6/2014 | He | H04W 72/21 |
| | | | 370/329 |
| 11,405,915 B2 * | 8/2022 | Nam | H04W 72/23 |

(Continued)

FOREIGN PATENT DOCUMENTS

| CN | 103765950 B * | 1/2019 | ............. H04B 7/024 |
| EP | 3809650 A1 * | 4/2021 | |

OTHER PUBLICATIONS

Qualcomm Incorporated, "Remaining issues on control resource set and search space", 3GPP TSG RAN WG1 Meeting #93, R1-1807353, Busan, Korea, May 21-May 25, 2018, Total Pages: 11 (Year: 2018).*

(Continued)

*Primary Examiner* — Shah M Rahman
(74) *Attorney, Agent, or Firm* — Holland & Hart LLP

(57) ABSTRACT

Methods, systems, and devices for wireless communications are described. A communication device, which may be otherwise known as user equipment (UE) may support repetition of physical downlink control channels (PDCCH) and handling a combined PDCCH candidate associated with multiple search space sets. For example, a UE may combine a first PDCCH candidate corresponding to a first search space set and a second PDCCH candidate corresponding to a second search space set to form a combined PDCCH candidate. The UE may decode the combined PDCCH candidate based on one or more factors, for example, such as a blind decoding PDCCH candidate threshold. As a result, the UE may decode the combined PDCCH candidate in addition to decoding of individual PDCCH candidates, thereby providing increased flexibility for downlink control information (DCI) and improving the reliability of PDCCH.

30 Claims, 16 Drawing Sheets

(51) Int. Cl.
*H04W 72/044* (2023.01)
*H04W 24/08* (2009.01)
*H04W 72/0446* (2023.01)
*H04W 72/23* (2023.01)

(52) U.S. Cl.
CPC ... *H04W 72/0446* (2013.01); *H04W 72/0466* (2013.01); *H04W 72/23* (2023.01)

(58) Field of Classification Search
CPC ... H04L 5/0055; H04L 5/0057; H04L 5/0048; H04W 24/08; H04W 48/12; H04W 72/02; H04W 72/042; H04W 72/0446; H04W 72/0466; H04W 72/23
See application file for complete search history.

(56) References Cited

U.S. PATENT DOCUMENTS

| | | | | |
|---|---|---|---|---|
| 2012/0034945 | A1* | 2/2012 | Wang | H04W 76/27 455/515 |
| 2012/0282964 | A1* | 11/2012 | Xiao | H04W 52/146 455/515 |
| 2018/0098307 | A1* | 4/2018 | Yang | H04L 5/0094 |
| 2018/0227074 | A1* | 8/2018 | Sun | H04L 1/0072 |
| 2018/0227102 | A1* | 8/2018 | John Wilson | H04L 5/0053 |
| 2019/0020448 | A1 | 1/2019 | John Wilson et al. | |
| 2019/0158317 | A1* | 5/2019 | Lee | H04L 5/0053 |
| 2019/0182807 | A1* | 6/2019 | Panteleev | H04L 5/0046 |
| 2019/0215098 | A1 | 7/2019 | Tiirola et al. | |
| 2019/0223164 | A1* | 7/2019 | He | H04L 25/0204 |
| 2019/0254025 | A1* | 8/2019 | Lee | H04L 5/0053 |
| 2019/0313321 | A1 | 10/2019 | Xu et al. | |
| 2019/0349155 | A1* | 11/2019 | Xu | H04L 5/0042 |
| 2020/0022144 | A1* | 1/2020 | Papasakellariou | H04W 72/0413 |
| 2020/0351896 | A1* | 11/2020 | Taherzadeh Boroujeni | H04L 5/0053 |
| 2020/0404669 | A1* | 12/2020 | Seo | H04W 72/0493 |
| 2021/0014837 | A1* | 1/2021 | Papasakellariou | H04W 72/042 |
| 2021/0028961 | A1* | 1/2021 | Lee | H04W 48/16 |
| 2021/0037607 | A1* | 2/2021 | Hamidi-Sepehr | H04L 5/001 |
| 2021/0045099 | A1* | 2/2021 | Shin | H04L 1/18 |
| 2021/0084637 | A1* | 3/2021 | Cheng | H04L 5/0053 |
| 2021/0143943 | A1* | 5/2021 | Zhou | H04W 72/0493 |
| 2021/0160002 | A1* | 5/2021 | Salah | H04W 72/048 |
| 2021/0320821 | A1* | 10/2021 | Lee | H04L 25/0204 |
| 2021/0345308 | A1* | 11/2021 | Liu | H04W 72/042 |
| 2021/0352501 | A1* | 11/2021 | Taherzadeh Boroujeni | H04W 24/08 |
| 2021/0377917 | A1* | 12/2021 | Xu | H04L 5/0053 |
| 2021/0385826 | A1* | 12/2021 | Moon | H04L 5/0053 |
| 2022/0007400 | A1* | 1/2022 | Zhang | H04L 1/1614 |
| 2022/0038207 | A1* | 2/2022 | Frenne | H04L 1/1887 |
| 2022/0124768 | A1* | 4/2022 | Frenne | H04L 5/0048 |

OTHER PUBLICATIONS

Qualcomm Incorporated, "Remaining issues on control resource set and search space", 3GPP TSG RAN WG1 Meeting #92, R1-1802834, Athens, Greece, Feb. 26-Mar. 2, 2018, Total Pages: 8 (Year: 2018).*
Ntel Corporation, "Remaining details and corrections on CORESETs and search spaces", 3GPP TSG RAN WG1 Meeting AH 1801, R1-1800323, Vancouver, Canada, Jan. 22-26, 2018, Total Pages: 4 (Year: 2018).*
ITRI, "Clarification on PDCCH search space", 3GPP TSG RAN WG1 Meeting AH 1801, R1-1800409, Vancouver, Canada, Jan. 22-26, 2018, Total Pages: 5 (Year: 2018).*
Huawei et al., "Discussion and TP on CORESET and search space configuration", 3GPP TSG RAN WG1 Ad Hoc Meeting, R1-1800822, Vancouver, Canada, Jan. 22-26, 2018, Total Pages: 5 (Year: 2018).*
NTT DOCOMO, Inc., "Offline summary for AI 7.1.3.1.2 Search space", 3GPP TSG RAN WG1 Meeting #93, R1-1807638, Busan, Korea, May 21-25, 2018 (Year: 2018).*
Vivo, "Discussion on PDCCH repetition for URLLC", 3GPP TSG RAN WG1 Meeting #92bis, R1-1803847, Sanya, China, Apr. 16-20, 2018, Total Pages: 6 (Year: 2018).*
Asustek: "Correction on Physical Downlink Control Channel", 3GPP TSG RAN WG1 #96bis, 3GPP Draft; R1-1905116 Correction on Physical Downlink Control Channel, 3rd Generation Partnership Project (3GPP), Mobile Competence Centre; 650, Route Des Lucioles; F-06921 Sophia-Antipolis Cedex, vol. RAN WG1, No. Xian, China; Apr. 8, 2019-Apr. 12, 2019, Apr. 7, 2019 (Apr. 7, 2019), 11 Pages, XP051700201, Retrieved from the Internet: URL: http://www.3gpp.org/ftp/Meetings%5F3GPP%5FSYNC/RAN1/Docs/R1%2D1905116%2Ezip [retrieved on Apr. 7, 2019] the whole document.
Huawei, et al., "Discussion on PDCCH Monitoring Capability", 3GPP TSG RAN WG1 Meeting #97, 3GPP Draft, R1-1907546, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), 6 Pages, XP051728979, Retrieved from the Internet: URL: http://www.3gpp.org/ftp/Meetings%5F3GPP%5FSYNC/RAN1/Docs/R1%2D1907546%2Ezip [retrieved on May 13, 2019] the whole document, Section 2.1 Enhancement on PDCCH Monitoring Capacity.
International Search Report and Written Opinion—PCT/US2020/058509—ISA/EPO—dated Feb. 19, 2021.

* cited by examiner

PHYSICAL DOWNLINK CONTROL CHANNEL CANDIDATES RELATED TO PHYSICAL DOWNLINK CONTROL CHANNEL REPETITIONS

CROSS REFERENCE

The present application for patent claims the benefit of U.S. Provisional Patent Application No. 62/952,211 by KHOSHNEVISAN et al., entitled "PHYSICAL DOWNLINK CONTROL CHANNEL CANDIDATES RELATED TO PHYSICAL DOWNLINK CONTROL CHANNEL REPETITIONS," filed Dec. 20, 2019, assigned to the assignee hereof, and expressly incorporated by reference herein.

FIELD OF TECHNOLOGY

The following relates generally to wireless communications and more specifically to physical downlink control channel (PDCCH) candidates related to PDCCH repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the described techniques relate to configuring a communication device, which may be otherwise known as user equipment (UE), to support repetition of physical downlink control channel (PDCCH) information in fifth generation (5G) systems. The described techniques may also be used to configure the communication device to support a combined PDCCH candidate, which may relate to multiple search space sets. The described techniques may be used to configure the communication device to monitor for and decode the combined PDCCH candidate in addition to individual PDCCH candidates related to the multiple search space sets. In some examples, the communication device may monitor for and decode the combined PDCCH candidate based on one or more factors, such as a PDCCH candidate threshold (e.g., a blind decoding limit) or a control resource threshold (e.g., a control channel element (CCE) limit), or both.

The described techniques may be used to configure the communication device to determine how the combined PDCCH candidate impacts the PDCCH candidate threshold (e.g., a blind decoding limit) or the control resource threshold (e.g., a CCE limit), or both. The communication device may thus include or exclude the combined PDCCH candidate from a blind decoding operation. Thereby the communication device may provide increased flexibility for control information and improvements to the reliability of PDCCH in 5G systems. The described techniques may include features for improvements to power consumption and, in some examples, may promote enhanced efficiency for high reliability and low latency operations in 5G systems, among other benefits.

A method of wireless communication at a UE is described. The method may include combining a first PDCCH candidate corresponding to a first search space set and a second PDCCH candidate corresponding to a second search space set to form a combined PDCCH candidate, assigning an additional PDCCH candidate to a set of PDCCH candidates, where the additional PDCCH candidate includes the combined PDCCH candidate, and monitoring the combined PDCCH candidate based on the assigning.

An apparatus for wireless communication is described. The apparatus may include a processor, memory coupled with the processor, and instructions stored in the memory. The instructions may be executable by the processor to cause the apparatus to combine a first PDCCH candidate corresponding to a first search space set and a second PDCCH candidate corresponding to a second search space set to form a combined PDCCH candidate, assign an additional PDCCH candidate to a set of PDCCH candidates, where the additional PDCCH candidate includes the combined PDCCH candidate, and decode the combined PDCCH candidate based on the assigning.

Another apparatus for wireless communication is described. The apparatus may include means for combining a first PDCCH candidate corresponding to a first search space set and a second PDCCH candidate corresponding to a second search space set to form a combined PDCCH candidate, assigning an additional PDCCH candidate to a set of PDCCH candidates, where the additional PDCCH candidate includes the combined PDCCH candidate, and monitoring the combined PDCCH candidate based on the assigning.

A non-transitory computer-readable medium storing code for wireless communication at a UE is described. The code may include instructions executable by a processor to combine a first PDCCH candidate corresponding to a first search space set and a second PDCCH candidate corresponding to a second search space set to form a combined PDCCH candidate, assign an additional PDCCH candidate to a set of PDCCH candidates, where the additional PDCCH candidate includes the combined PDCCH candidate, and decode the combined PDCCH candidate based on the assigning.

Some examples of the method, apparatuses, and non-transitory computer-readable medium described herein may further include operations, features, means, or instructions for determining that the set of PDCCH candidates including the additional PDCCH candidate, the first PDCCH candidate, the second PDCCH candidate, and the combined PDCCH candidate satisfies a threshold, the threshold including a threshold number of PDCCH candidates within a time interval, and where monitoring the combined PDCCH candidate may be based on the set of PDCCH candidates including the additional PDCCH candidate satisfying the threshold.

Some examples of the method, apparatuses, and non-transitory computer-readable medium described herein may further include operations, features, means, or instructions for determining a first control resource set associated with the first search space set, identifying a first pool index configuration associated with the first control resource set, where monitoring the combined PDCCH candidate may be based on the first pool index configuration, and determining a threshold for PDCCH candidates in the first control resource set associated with the first pool index configuration.

Some examples of the method, apparatuses, and non-transitory computer-readable medium described herein may further include operations, features, means, or instructions for determining a second control resource set associated with the second search space set, identifying a second pool index configuration associated with the second control resource set, where monitoring the combined PDCCH candidate may be based on the second pool index configuration, and determining a threshold for PDCCH candidates in the second control resource set associated with the second pool index configuration.

Some examples of the method, apparatuses, and non-transitory computer-readable medium described herein may further include operations, features, means, or instructions for determining that the first pool index configuration may be different than the second pool index configuration, and assigning the additional PDCCH candidate to the first pool index configuration, or the second pool index configuration, or both, where monitoring the combined PDCCH candidate may be based on determining that the first pool index configuration may be different than the second pool index configuration.

Some examples of the method, apparatuses, and non-transitory computer-readable medium described herein may further include operations, features, means, or instructions for determining that the first pool index configuration and the second pool index configuration may have a same pool index configuration, assigning the additional PDCCH candidate to the first pool index configuration associated with the first control resource set or the second pool index configuration associated with the second control resource set, and where monitoring the combined PDCCH candidate may be based on determining that the first pool index configuration and the second pool index configuration may have the same pool index configuration.

Some examples of the method, apparatuses, and non-transitory computer-readable medium described herein may further include operations, features, means, or instructions for identifying that the UE may be configured with a number of PDCCH candidates in the set of PDCCH candidates including the additional PDCCH candidate, determining that the number of PDCCH candidates satisfies a threshold number of blind decoding PDCCH candidates for a primary serving cell or a threshold number of CCEs for the primary serving cell, or both, and where monitoring the combined PDCCH candidate may be based on the number of PDCCH candidates satisfying the threshold number of blind decoding PDCCH candidates for the primary serving cell or the threshold number of CCEs for the primary serving cell, or both.

Some examples of the method, apparatuses, and non-transitory computer-readable medium described herein may further include operations, features, means, or instructions for identifying blind decoding PDCCH candidates in the set of PDCCH candidates or CCEs in the set of PDCCH candidates, or both associated with a common search space set, and excluding the blind decoding PDCCH candidates or the CCEs, or both associated with the common search space set from the threshold number of blind decoding PDCCH candidates for the primary serving cell or the threshold number of CCEs for the primary serving cell, or both.

Some examples of the method, apparatuses, and non-transitory computer-readable medium described herein may further include operations, features, means, or instructions for identifying a UE-specific search space set associated with a lowest search space index, identifying a number of blind decoding PDCCH candidates or a number of CCEs, or both associated with the UE-specific search space set, and where monitoring the combined PDCCH candidate may be based on the number of blind decoding PDCCH candidates or the number of CCEs, or both associated with the UE-specific search space set.

Some examples of the method, apparatuses, and non-transitory computer-readable medium described herein may further include operations, features, means, or instructions for determining a remainder of PDCCH candidates in the set of PDCCH candidates based on the excluding, determining a difference between the remainder of PDCCH candidates and the number of blind decoding PDCCH candidates associated with the UE-specific search space set, and allocating the remainder of PDCCH candidates and applying the number of blind decoding PDCCH candidates associated with the UE-specific search space set to the threshold number of blind decoding PDCCH candidates for the primary serving cell.

Some examples of the method, apparatuses, and non-transitory computer-readable medium described herein may further include operations, features, means, or instructions for determining that the first pool index configuration associated with the first control resource set may be different than the second pool index configuration associated with the second control resource set, determining that the combined PDCCH candidate may be for a UE-specific search space associated with the primary serving cell, and applying the combined PDCCH candidate to the threshold number of blind decoding PDCCH candidates for the primary serving cell, where monitoring the combined PDCCH candidate may be based on the applying. In some examples of the method, apparatuses, and non-transitory computer-readable medium described herein, the combined PDCCH candidate is allocated to the UE based at least in part on determining that the first pool index configuration is different than the second pool index configuration and that the combined PDCCH candidate is for a UE-specific search space. In some examples of the method, apparatuses, and non-transitory computer-readable medium described herein, the combined PDCCH is counted for overbooking of PDCCH candidates for the primary search cell and satisfies a threshold number of PDCCH candidates for the primary serving cell.

In some examples of the method, apparatuses, and non-transitory computer-readable medium described herein, the combined PDCCH candidate may be counted for overbooking of PDCCH candidates for the primary serving cell.

In some examples of the method, apparatuses, and non-transitory computer-readable medium described herein, the combined PDCCH candidate may be allocated, based on determining that the first pool index configuration associated with the first control resource set may be different than the second pool index configuration associated with the second control resource set, to the UE and satisfies the threshold number of PDCCH candidates for the primary serving cell.

In some examples of the method, apparatuses, and non-transitory computer-readable medium described herein, the combined PDCCH candidate may be allocated, based on determining that the combined PDCCH candidate may be for the UE-specific search space associated with the primary serving cell, to the UE and satisfies the threshold number of PDCCH candidates for the primary serving cell.

Some examples of the method, apparatuses, and non-transitory computer-readable medium described herein may further include operations, features, means, or instructions for determining that the first pool index configuration associated with the first control resource set and the second pool index configuration associated with the second control resource set may have a same pool index configuration, and determining that the combined PDCCH candidate may be for a UE-specific search space associated with the primary serving cell, where monitoring the combined PDCCH candidate may be based on the UE-specific search space associated with the primary serving cell.

Some examples of the method, apparatuses, and non-transitory computer-readable medium described herein may further include operations, features, means, or instructions for excluding the combined PDCCH candidate from the threshold number of blind decoding PDCCH candidates for the primary serving cell based on one or more of that the first pool index configuration associated with the first control resource set and the second pool index configuration associated with the second control resource set may have the same pool index configuration, or that the combined PDCCH candidate may be for the UE-specific search space associated with the primary serving cell, or both. In some examples of the method, apparatuses, and non-transitory computer-readable medium described herein, the combined PDCCH candidate is not counted for overbooking of PDCCH candidates for the primary serving cell.

In some examples of the method, apparatuses, and non-transitory computer-readable medium described herein, the combined PDCCH candidate may be not counted for overbooking of PDCCH candidates for the primary serving cell.

Some examples of the method, apparatuses, and non-transitory computer-readable medium described herein may further include operations, features, means, or instructions for determining a first priority associated with a first search space set index of the combined PDCCH candidate, and determining a second priority associated with a second search space set index of the combined PDCCH candidate, where monitoring the combined PDCCH candidate may be based on the first priority or the second priority, or both.

Some examples of the method, apparatuses, and non-transitory computer-readable medium described herein may further include operations, features, means, or instructions for determining a sum of the first search space set index and the second search space set index of the combined PDCCH candidate, determining that the first search space set index or the second search space set index is a lowest or a highest search space set index of a set of search space set indices, and ordering the combined PDCCH candidate with respect to other combined PDCCH candidates in the set of PDCCH candidates based at least in part on the first priority associated with the first search space set index, the second priority associated with the second search space set index, the lowest or the highest search space index of the combined PDCCH candidate, the sum of the first search space set index and the second search space set index, or any combination thereof, wherein monitoring the combined PDCCH candidate is based at least in part on the first priority, the second priority, the ordering, or any combination thereof.

Some examples of the method, apparatuses, and non-transitory computer-readable medium described herein may further include operations, features, means, or instructions for ordering the combined PDCCH candidate with respect to other combined PDCCH candidates in the set of PDCCH candidates based on the first priority associated with the first search space set index or the second priority associated with the second search space set index, or both of the combined PDCCH candidate.

In some examples of the method, apparatuses, and non-transitory computer-readable medium described herein, the first search space set index or the second search space set index may be a lowest search space set index of a set of search space set indices, where ordering the combined PDCCH candidate with respect to other combined PDCCH candidates in the set of PDCCH candidates may be based on the lowest search space set index of the combined PDCCH candidate.

In some examples of the method, apparatuses, and non-transitory computer-readable medium described herein, the first search space set index or the second search space set index may be a highest search space set index of a set of search space set indices, where ordering the combined PDCCH candidate with respect to other combined PDCCH candidates in the set of PDCCH candidates may be based on the highest search space set index of the combined PDCCH candidate.

Some examples of the method, apparatuses, and non-transitory computer-readable medium described herein may further include operations, features, means, or instructions for determining a sum of the first search space set index and the second search space set index of the combined PDCCH candidate, where ordering the combined PDCCH candidate with respect to other combined PDCCH candidates in the set of PDCCH candidates may be based on the sum.

In some examples of the method, apparatuses, and non-transitory computer-readable medium described herein, the combined PDCCH candidate may be defined over one or more search space indices of a set of search space set indices.

Some examples of the method, apparatuses, and non-transitory computer-readable medium described herein may further include operations, features, means, or instructions for ordering jointly the combined PDCCH candidate and one or more PDCCH candidates in the set of PDCCH candidates based on corresponding search space set indices associated with the combined PDCCH candidate and search space set indices associated with the one or more PDCCH candidates in the set of PDCCH candidates, wherein the search space set indices associated with the combined PDCCH candidate have a higher priority than the search space set indices associated with the one or more PDCCH candidates.

In some examples of the method, apparatuses, and non-transitory computer-readable medium described herein, the search space set indices associated with the combined PDCCH candidate may have a higher priority than the search space set indices associated with the one or more PDCCH candidates.

Some examples of the method, apparatuses, and non-transitory computer-readable medium described herein may further include operations, features, means, or instructions for ordering the combined PDCCH candidate based on a sum of search space indices of the combined PDCCH candidate.

Some examples of the method, apparatuses, and non-transitory computer-readable medium described herein may further include operations, features, means, or instructions for identifying a PDCCH demodulation reference signal scrambling identifier associated with the combined PDCCH candidate, and where the PDCCH demodulation reference signal scrambling identifier associated with the combined PDCCH candidate may have a same value as a PDCCH demodulation reference signal scrambling identifier associated with the first search space set or the second search space set, or both.

Some examples of the method, apparatuses, and non-transitory computer-readable medium described herein may further include operations, features, means, or instructions for refraining from separately counting CCEs of the combined PDCCH candidate for a nonoverlapping control channel threshold per slot.

Some examples of the method, apparatuses, and non-transitory computer-readable medium described herein may further include operations, features, means, or instructions for determining that a PDCCH demodulation reference signal scrambling identifier associated with the first search space set or the second search space set, or both, where monitoring the combined PDCCH candidate is based at least in part on the determining.

Some examples of the method, apparatuses, and non-transitory computer-readable medium described herein may further include operations, features, means, or instructions for monitoring the combined PDCCH candidate may be based on determining that the PDCCH demodulation reference signal scrambling identifier associated with the combined PDCCH candidate may be different than the PDCCH demodulation reference signal scrambling identifier associated with the first search space set or the second search space set, or both.

Some examples of the method, apparatuses, and non-transitory computer-readable medium described herein may further include operations, features, means, or instructions for separately counting CCEs of the combined PDCCH candidate for a nonoverlapping control channel threshold per slot.

In some examples of the method, apparatuses, and non-transitory computer-readable medium described herein, the first search space set may be different than the second search space set.

Some examples of the method, apparatuses, and non-transitory computer-readable medium described herein may further include operations, features, means, or instructions for combining the first PDCCH candidate and the second PDCCH candidate may be based on a capability of the UE.

In some examples of the method, apparatuses, and non-transitory computer-readable medium described herein, a threshold number of combined PDCCH candidates within a time interval may be based on the capability of the UE.

In some examples of the method, apparatuses, and non-transitory computer-readable medium described herein, a threshold number of combined PDCCH candidates may be per slot or PDCCH span.

In some examples of the method, apparatuses, and non-transitory computer-readable medium described herein, a threshold number of combined PDCCH candidates may be per PDCCH span.

In some examples of the method, apparatuses, and non-transitory computer-readable medium described herein, the first search space set and the second search space set may have a same search space type.

A method of wireless communication at a base station is described. The method may include configuring an association between a first PDCCH candidate corresponding to a first search space set and a second PDCCH candidate corresponding to a second search space set to form a combined PDCCH candidate and transmitting an indication of the association between the first PDCCH candidate and the second PDCCH candidate.

An apparatus for wireless communication is described. The apparatus may include a processor, memory coupled with the processor, and instructions stored in the memory. The instructions may be executable by the processor to cause the apparatus to configure an association between a first PDCCH candidate corresponding to a first search space set and a second PDCCH candidate corresponding to a second search space set to form a combined PDCCH candidate and transmit an indication of the association between the first PDCCH candidate and the second PDCCH candidate.

Another apparatus for wireless communication is described. The apparatus may include means for configuring an association between a first PDCCH candidate corresponding to a first search space set and a second PDCCH candidate corresponding to a second search space set to form a combined PDCCH candidate and transmitting an indication of the association between the first PDCCH candidate and the second PDCCH candidate.

A non-transitory computer-readable medium storing code for wireless communication at a base station is described. The code may include instructions executable by a processor to configure an association between a first PDCCH candidate corresponding to a first search space set and a second PDCCH candidate corresponding to a second search space set to form a combined PDCCH candidate and transmit an indication of the association between the first PDCCH candidate and the second PDCCH candidate.

Some examples of the method, apparatuses, and non-transitory computer-readable medium described herein may further include operations, features, means, or instructions for configuring a priority between the first PDCCH candidate corresponding to the first search space set and the second PDCCH candidate corresponding to the second search space set, the threshold number of PDCCH candidates within the time interval is per slot or PDCCH span, and transmitting a second indication of the priority between the first PDCCH candidate corresponding to the first search space set and the second PDCCH candidate corresponding to the second search space set.

Some examples of the method, apparatuses, and non-transitory computer-readable medium described herein may further include operations, features, means, or instructions for allocating PDCCH candidates to a set of PDCCH candidates, and transmitting a second indication of the allocated PDCCH candidates of the set of PDCCH candidates.

Some examples of the method, apparatuses, and non-transitory computer-readable medium described herein may further include operations, features, means, or instructions for receiving a UE capability, configuring a threshold number of combined PDCCH candidates within a time interval based on the UE capability, and transmitting a second indication of the threshold number of combined PDCCH candidates.

In some examples of the method, apparatuses, and non-transitory computer-readable medium described herein, a threshold number of PDCCH candidates within the time interval may be per slot.

In some examples of the method, apparatuses, and non-transitory computer-readable medium described herein, a threshold number of PDCCH candidates within the time interval may be per PDCCH span.

In some examples of the method, apparatuses, and non-transitory computer-readable medium described herein, the first search space set may be different than the second search space set.

In some examples of the method, apparatuses, and non-transitory computer-readable medium described herein, a first control resource set associated with the first search space set may have a different pool index configuration than a second control resource set associated with the second search space set.

In some examples of the method, apparatuses, and non-transitory computer-readable medium described herein, a first control resource set associated with the first search space set and a second control resource set associated with the second search space set may have a same pool index configuration.

In some examples of the method, apparatuses, and non-transitory computer-readable medium described herein, the first search space set and the second search space set may have a same search space type.

DETAILED DESCRIPTION

Figure 1:
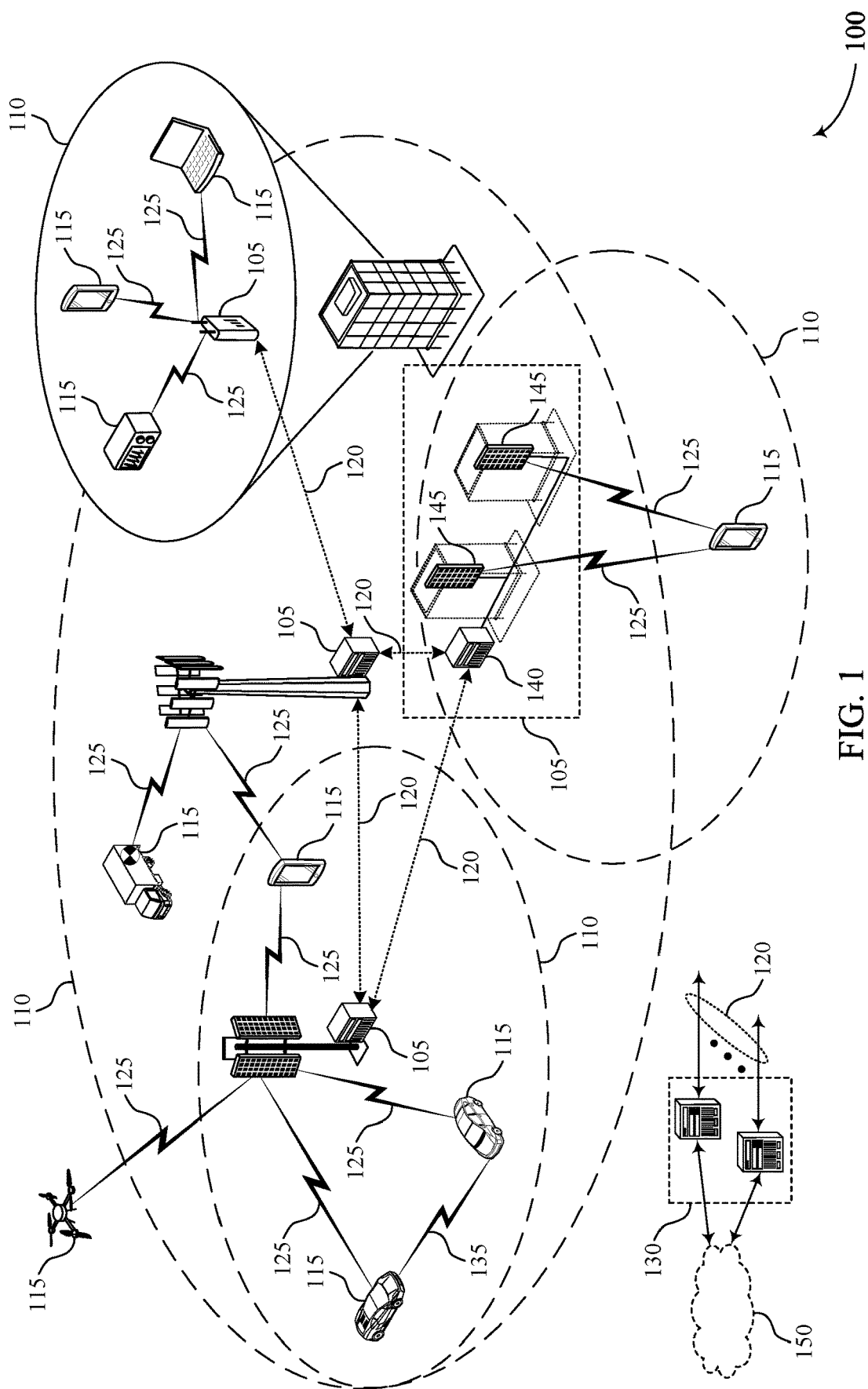
FIGS. 1 and 2 illustrate examples of a wireless communications system that support physical downlink control channel (PDCCH) candidates related to PDCCH repetitions in accordance with aspects of the present disclosure.

Wireless communications systems may include multiple communication devices such as user equipment (UEs) and base stations, which may provide wireless communication services to the UEs. For example, such base stations may be next-generation NodeBs or giga-NodeBs (either of which may be referred to as a gNB) that may support multiple radio access technologies including fourth generation (4G) systems, such as Long Term Evolution (LTE) systems, as well as fifth generation (5G) systems, which may be referred to as New Radio (NR) systems. The described techniques may be used to configure the UEs to support repetition of various physical channels, such as physical downlink shared channels (PDSCH) to improve reliability of various types of communication. In some examples, the described techniques may be used to configure the UEs to support repetition of other physical channels, such as physical downlink control channels (PDCCH) to extend the reliability of the various types of communication (e.g., control information, data).

The described techniques may be used to configure the UEs to support a combined PDCCH candidate, which may relate to multiple search space sets. For example, a UE may combine a PDCCH candidate corresponding to a search space set and another PDCCH candidate corresponding to another search space set to form a combined PDCCH candidate. The described techniques may be used to configure the UEs to monitor for and decode the combined PDCCH candidate in addition to individual PDCCH candidates related to the multiple search space sets. In some examples, the UEs may monitor for and decode the combined PDCCH candidate based on one or more factors, such as a PDCCH candidate threshold (e.g., a blind decoding limit) or a control resource threshold (e.g., a control channel element (CCE) limit), or both.

In some examples, the described techniques may be used to configure the UEs to determine how the combined PDCCH candidate may impact the PDCCH candidate threshold (e.g., a blind decoding limit) or the control resource threshold (e.g., a CCE limit), or both. The UEs may thus include or exclude the combined PDCCH candidate from a blind decoding operation. Thereby the UEs may provide extended flexibility for control information and improvements to the reliability of PDCCH in 5G systems. The described techniques may include features for improvements to power consumption and, in some examples, may promote enhanced efficiency for high reliability and low latency operations in 5G systems, among other benefits.

Aspects of the disclosure are initially described in the context of wireless communications systems. Aspects of the disclosure are further illustrated by and described with reference to process flows that illustrate PDCCH candidates related to PDCCH repetitions. Aspects of the disclosure are further illustrated by and described with reference to apparatus diagrams, system diagrams, and flowcharts that relate to PDCCH candidates related to PDCCH repetitions.

FIG. 1 illustrates an example of a wireless communications system 100 that supports PDCCH candidates related to PDCCH repetitions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1. The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$)

and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). A slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set) for a physical control channel may be defined by a number of symbol periods and may extend across the system bandwidth or a subset of the system bandwidth of the carrier. One or more control regions may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., CCEs) associated with encoded information for a control information format having a given payload size. Search space sets may include common search space sets configured for sending control information to multiple UEs 115 and UE-specific search space sets for sending control information to a specific UE 115.

The UEs 115 may support repetition of various physical channels, such as PDSCH to improve reliability of various types of communication. In some examples, the UEs 115 may support repetition of other physical channels, such as PDCCH to extend the reliability of the various types of communication (e.g., control information, data). The UEs 115 may also support a combined PDCCH candidate, which may relate to multiple search space sets. For example, a UE 115 may combine a PDCCH candidate corresponding to a search space set and another PDCCH candidate corresponding to another search space set to form a combined PDCCH candidate. The UEs 115 may monitor for and decode the combined PDCCH candidate in addition to individual PDCCH candidates related to the multiple search space sets. In some examples, the UEs 115 may monitor for and decode the combined PDCCH candidate based on one or more factors, such as a PDCCH candidate threshold (e.g., a blind decoding limit) or a control resource threshold (e.g., a CCE limit), or both. In some examples, the UEs 115 may determine how the combined PDCCH candidate may impact the PDCCH candidate threshold (e.g., a blind decoding limit) or the control resource threshold (e.g., a CCE limit), or both. The UEs 115 may thus include or exclude the combined PDCCH candidate from a blind decoding operation. Thereby the UEs 115 may provide extended flexibility for control information and improvements to the reliability of PDCCH in 5G systems, such as the wireless communications system 100.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
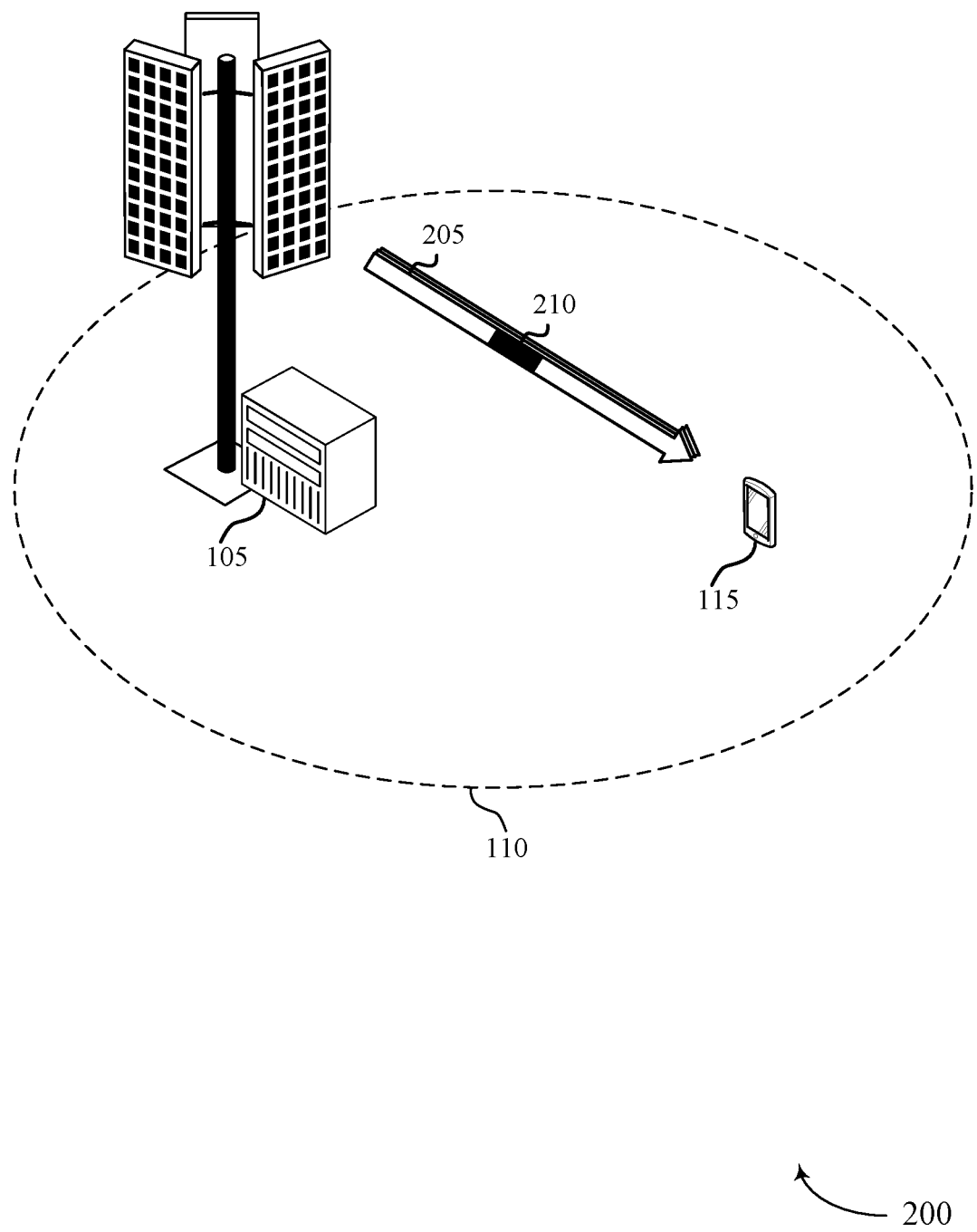

FIG. 2 illustrates an example of a wireless communications system 200 that supports PDCCH candidates related to PDCCH repetitions in accordance with aspects of the present disclosure. In some examples, the wireless communications system 200 may implement aspects of the wireless communications system 100. For example, the wireless communications system 200 may include a base station 105 and a UE 115 within a geographic coverage area 110. The base station 105 and the UE 115 may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency search space operations, among other benefits.

The base station 105 may configure the UE 115 by transmitting a configuration message 210 via one or more directional beams 205 (e.g., downlink directional beams). In some examples, the base station 105 may transmit the configuration message 210 on a downlink channel (e.g., a PDCCH) via the one or more directional beams 205. The configuration message 210 may include a configuration of one or more multiple search space sets. For example, the configuration may define a search space set for a downlink control channel (e.g., a PDCCH). In some examples, the configuration may be a semi-static configuration. The base station 105 may provide the semi-static configuration to the UE 115 via RRC signaling. Additionally or alternatively, the base station 105 may provide the configuration of the one or more multiple search space sets via downlink control signaling.

A search space set may include a common search space set configured for multiple UEs or a specific search space set configured for a specific UE (e.g., for the UE 115). The UE 115 may monitor one or more control regions of a search space set to receive, from the base station 105, and decode control information or data, or both on a physical channel (e.g., a PDCCH, a PDSCH). A control region (e.g., a control resource set) for a physical channel may be defined by a number of symbol durations, a number of minislot durations, or a number of slot durations. One or more control regions (e.g., one or more control resource sets) may be configured for multiple UEs. For example, multiple UEs may monitor or search control regions for control information according to one or more search space sets, and each search space set may include one or multiple control channel candidates (e.g., PDCCH candidates) in one or more aggregation levels. An aggregation level for a PDCCH candidate may refer to a number of control channel resources (e.g., CCEs).

In some examples, such as in 5G systems, the base station 105 may configure the UE 115 with one or multiple PDCCH candidates in a search space set. The UE 115 may, in some examples, experience a decrease in efficiency of blind decoding of the one or multiple PDCCH candidates in the search space set. That is, some of the one or multiple PDCCH candidates in the search space may not be useful to the UE 115 due to communication operations by the base station 105, and therefore decrease the efficiency of blind decoding by the UE 115. The communication operations may include control information or data, or both associated with various information channels (e.g., control channels, data channels). Control channels may include a PDCCH, a physical control channel may include physical uplink control channel (PUCCH), among other examples. Data channels may include a PDSCH, a physical uplink shared channel (PUSCH), among other examples.

The wireless communications system 200 may, in some cases, support repetition of various physical channels, such as PDSCH, to improve reliability of various types of communication. The wireless communications system 200 may also support repetition of other physical channels, such as PDCCH to further improve the reliability of the various types of communication (e.g., control information, data) in the wireless communications system 200. For example, by supporting PDCCH repetition, the UE 115 may experience an increase in efficiency of blind decoding of one or multiple PDCCH candidates in one or multiple search space sets. In some examples, the base station 105 may configure the UE 115 to support one or multiple PDCCH candidates between multiple (e.g., two or more) search space sets. For example, the UE 115 may be configured to determine and combine different PDCCH candidates between multiple search space sets, and perform blind decoding of a combined PDCCH candidate. In some examples, the UE 115 may be configured to decode the combined PDCCH candidate in addition to individual PDCCH candidates, thereby providing increased flexibility for control information and improving the reliability of PDCCH.

The UE 115 may be configured to monitor for and decode the combined PDCCH candidate based on one or more factors, such as a PDCCH candidate threshold (e.g., a blind decoding limit) or a control resource threshold (e.g., a CCE limit), or both. In some examples, the UE 115 may determine whether to count or not to count a PDCCH candidate for a search space set as a monitored PDCCH candidate. For example, the UE 115 may be configured to not count a first PDCCH candidate for a first search space set using a set of CCEs in a first control resource set for a serving cell (e.g., the base station 105) as a monitored PDCCH candidate, if there is a second PDCCH candidate for a second search space set using a same set of CCEs or has a same PDCCH DMRS scrambling identifier, or both. Otherwise, the UE 115 may count the first PDCCH candidate as a monitored PDCCH candidate. In some examples, the UE 115 may be configured to monitor for and decode the combined PDCCH candidate based on a subcarrier spacing configuration ($\mu$).

The UE 115 may be configured to support one or more subcarrier spacing configuration ($\mu$) for a component carrier. A component carrier may relate to one or more BWPs having same or different numerologies. In some examples, the UE 115 may be configured with multiple BWPs. A BWP may be a downlink BWP or an uplink BWP. In some examples, the UE 115 may be configured with a threshold number of monitored PDCCH candidates for one or more multiple BWPs. For example, the UE 115 may be configured according to Table. 1.

Table 1 provides a maximum number of monitored PDCCH candidates, $M_{PDCCH}^{max,slot,\mu}$, for a subcarrier spacing configuration ($\mu$) for the UE 115 per slot. The UE 115 may be configured to operate according to the subcarrier spacing configuration ($\mu$) for a single serving cell (e.g., the base station 105). The maximum number of monitored PDCCH candidates may, in some examples, be per slot for a downlink BWP. As such, the maximum number of monitored PDCCH candidates may be a threshold number of PDCCH candidates that the UE 115 is configured to monitor over a period (e.g., a PDCCH span, a slot). In some examples, the UE 115 may be configured with separate maximum number of monitored PDCCH candidates per downlink serving cell for each component carrier when the UE 115 has more than four downlink serving cells or fewer.

TABLE 1

Maximum number $M_{PDCCH}^{max,\ slot,\ \mu}$ of monitored PDCCH candidates per slot for a downlink BWP with subcarrier spacing configuration configuration $\mu \in \{0, 1, 2, 3\}$ for a single serving cell

| $\mu$ | Maximum number of monitored PDCCH candidates per slot and per serving cell $M_{PDCCH}^{max,\ slot,\ \mu}$ |
|---|---|
| 0 | 44 |
| 1 | 36 |
| 2 | 22 |
| 3 | 20 |

In some examples, the UE 115 may be configured with a threshold number of monitored CCEs for one or more multiple BWPs. For example, the UE 115 may be configured according to Table. 2, which provides a maximum number of nonoverlapped CCEs, $C_{PDCCH}^{max,slot,\mu}$, for a subcarrier spacing configuration ($\mu$) that the UE 115 may monitor over a period (e.g., a PDCCH span, a slot). The UE 115 may be configured to operate according to the subcarrier spacing configuration ($\mu$) for a single serving cell (e.g., the base station 105). In some examples, the UE 115 may be configured to support carrier aggregation with more than four downlink serving cells. In such examples, the UE 115 may provide, to the base station 105, a UE capability message including an indication that the UE 115 supports more than four downlink serving cells.

For example, the indication may be an information element in the UE capability message. In some examples, the information element may be a PDCCH blind detection carrier aggregation (PDCCH-BlindDetectionCA) information element. In some examples, the maximum number of monitored PDCCH candidates or the maximum number of nonoverlapped CCEs, or both may be defined across one or more multiple downlink serving cells with a same subcarrier spacing configuration (μ) based on the UE capability message. In some other examples, the maximum number of monitored PDCCH candidates or the maximum number of nonoverlapped CCEs, or both may be defined across one or more multiple downlink serving cells with a same subcarrier spacing configuration (μ) based on a number of downlink component carriers associated with the subcarrier spacing configuration (μ).

TABLE 2

Maximum number $C_{PDCCH}^{max,\,slot,\,\mu}$ of nonoverlapped CCEs per slot for subcarrier spacing configuration configuration $\mu \in \{0, 1, 2, 3\}$ for a single serving cell

| μ | Maximum number of nonoverlapped CCEs per slot and per serving cell $C_{PDCCH}^{max,\,slot,\,\mu}$ |
|---|---|
| 0 | 56 |
| 1 | 56 |
| 2 | 48 |
| 3 | 32 |

With reference to Tables 1 and 2, the UE 115 may be configured to support carrier aggregation with a maximum of four downlink serving cells. The UE 115 may be configured with $N_{cells}^{DL,\mu}$ downlink cells for each corresponding subcarrier spacing configuration (μ), where $\Sigma_{\mu=0}^{3} N_{cells}^{DL,\mu} \leq 4$. In some examples, for scheduling on a same serving cell (e.g., the base station 105), the UE 115 may be configured to monitor $M_{PDCCH}^{max,slot,\mu}$ PDCCH candidates for control information (e.g., downlink control information (DCI)) and $C_{PDCCH}^{max,slot,\mu}$ nonoverlapped CCEs per slot per serving cell with a subcarrier spacing configuration (μ).

In some examples, the UE 115 may be configured to support carrier aggregation with more than four downlink serving cells, and the UE 115 may indicate through a UE capability message (e.g., PDCCH-BlindDetectionCA) a capability to monitor PDCCH candidates for downlink serving cells. As such, when the UE 115 is configured with $N_{cells}^{DL,\mu}$ with a subcarrier spacing configuration (μ), the UE 115 may be configured to monitor a total of $M_{PDCCH}^{max,slot,\mu}$ PDCCH candidates for control information (e.g., DCI) and $C_{PDCCH}^{max,slot,\mu}$ nonoverlapped CCEs per slot per serving cell with a subcarrier spacing configuration (μ). The UE 115 may, in some examples, not be configured with search space sets (e.g., common search space sets) that result to corresponding total number of monitored PDCCH candidates and nonoverlapped CCEs per slot that exceed a corresponding maximum numbers per slot.

The base station 105 may overbook the UE 115 with PDCCH candidates. That is, the base station 105 may configure the UE 115 with PDCCH candidates that may result in exceeding the PDCCH candidate threshold (e.g., a blind decoding limit) or the control resource threshold (e.g., a CCE limit), or both for the base station 105 (e.g., a primary serving cell). In some examples, the base station 105 and the UE 115 may not be configured to support overbooking for secondary serving cells. The UE 115 may be configured to monitor PDCCH candidates and CCEs up to the PDCCH candidate threshold or the control resource threshold, or both. For example, the UE 115 may be configured to monitor PDCCH candidates and CCEs up to the PDCCH candidate threshold or the control resource threshold, or both according to the following pseudocode. In other words, the UE 115 may allocate monitored PDCCH candidates to search space sets (e.g., UE-specific search space sets) of a primary serving cell (e.g., the base station 105) with a subcarrier spacing configuration (μ) according to the following operations (e.g., pseudocode). The UE 115 is not expected to monitor PDCCH in a UE-specific search space set without monitored PDCCH candidates.

Set $M_{PDCCH}^{uss} = \min(M_{PDCCH}^{max,slot,\mu}, M_{PDCCH}^{total,slot,\mu}) - M_{PDCCH}^{css}$
Set $C_{PDCCH}^{uss} = \min(C_{PDCCH}^{max,slot,\mu}, C_{PDCCH}^{total,slot,\mu}) - C_{PDCCH}^{css}$
Set j = 0
while $\Sigma_L M_{P_{uss}(j),S_{uss}(j)}^{(L),monitor} \leq M_{PDCCH}^{uss}$ and $C(V_{CCE}(S_{uss}(j))) \leq C_{PDCCH}^{uss}$
   allocate $\Sigma_L M_{P_{uss}(j),S_{uss}(j)}^{(L),monitor}$ monitored PDCCH candidates for monitoring to UE-specific search space (USS) set $S_{uss}(j)$
   $M_{PDCCH}^{uss} = M_{PDCCH}^{uss} - \Sigma_L M_{P_{uss}(j),S_{uss}(j)}^{(L),monitor}$;
   $C_{PDCCH}^{uss} = C_{PDCCH}^{uss} - C(V_{CCE}(S_{uss}(j)))$;
   j = j + 1;
end while.

The $V_{CCE}(S_{uss}(j))$ may include a set of nonoverlapping CCEs for a search space set $S_{uss}(j)$, and $C(V_{CCE}(S_{uss}(j)))$ may define a cardinality of $V_{CCE}(S_{uss}(j))$ where nonoverlapping CCEs for the search space set $S_{uss}(j)$ are determined considering the monitored PDCCH candidates for the common search space sets and the monitored PDCCH candidates for all search space sets $S_{uss}(k)$ for $0 \leq k \leq j$.

The UE 115 may thus, according to the above operations, exclude PDCCH candidates or CCEs, or both that correspond to common search space sets from the PDCCH candidate threshold or the control resource threshold, or both. In some examples, excluding the PDCCH candidates or the CCEs, or both, that correspond to the common search space sets, from the PDCCH candidate threshold or the control resource threshold, or both may be because the common search space sets have a higher priority compared to UE-specific search space sets. In some examples, the UE 115 may begin with UE-specific search space sets, and more specifically with a lowest search space set index in the UE-specific search space sets. If the remaining PDCCH candidates or CCEs, or both is greater than a number of PDCCH candidates or CCEs, or both configured for the UE-specific search space sets, the UE 115 may allocate and subtract the number of PDCCH candidates or CCEs, or both configured for the UE-specific search space sets from the remaining PDCCH candidates or CCEs, or both. The UE 115 may cover one or more UE-specific search space sets and repeat the above operations. Thus, overbooking may be with respect to the per scheduled cell PDCCH candidate threshold or control resource threshold, or both.

The base station 105 may configure the UE 115 with one or more control resource set pool indices (also referred to as control resource pool index configuration) per control resource set. In some examples, each control resource set may have a separate control resource set pool index. In some examples, the base station 105 may increase or decrease the PDCCH candidate threshold (e.g., a blind decoding limit) or the control resource threshold (e.g., a CCE limit), or both by a factor. For example, the UE 115 may provide a value in a UE capability message, and the base station 105 may increase or decrease the PDCCH candidate threshold (e.g., a blind decoding limit) or the control resource threshold (e.g., a CCE limit), or both based on the indicated value. The increased or decreased PDCCH candidate threshold (e.g., a blind decoding limit) or the increased or decreased control resource threshold (e.g., a CCE limit), or both may be over all control resource sets for an active BWP associated with the base station 105 (e.g., a primary serving cell).

Additionally, the PDCCH candidate threshold (e.g., a blind decoding limit) or the control resource threshold (e.g., a CCE limit), or both may be defined per control resource set pool index configuration. In some examples, for overbooking in a primary serving cell (e.g., the base station 105), when the PDCCH candidate threshold (e.g., a blind decoding limit) or the control resource threshold (e.g., a CCE limit), or both per control resource set pool index configuration is smaller than the PDCCH candidate threshold (e.g., a blind decoding limit) or the control resource threshold (e.g., a CCE limit), or both for the primary serving cell, search space sets associated with the control resource set that have a control resource set pool index configuration of zero (CORESETPoolIndex=0) may be considered for overbooking. The control resource set pool index configuration may have a value of 0 or 1. The UE 115 may be configured to determine how a combined PDCCH candidate impacts the PDCCH candidate threshold or the control resource threshold, or both per slot. In some examples, the UE 115 may also be configured to determine how a combined PDCCH candidate impacts overbooking. Additionally or alternatively, the UE 115 may be configured to determine how a combined PDCCH candidate impacts a control resource set pool index configuration.

The UE 115 may be configured to count each combined PDCCH candidate as an additional PDCCH candidate toward a PDCCH candidate threshold (e.g., a blind decoding limit) or a control resource threshold (e.g., a CCE limit), or both, per serving cell. The UE 115 may also be configured to count each combined PDCCH candidate as an additional PDCCH candidate toward a total PDCCH candidate threshold (e.g., a blind decoding limit) or a total control resource threshold (e.g., a CCE limit), or both. In some examples, the UE 115 may determine that a first control resource set pool index configuration (CORESETPoolIndex) of a first control resource set i is not equal to a second control resource set pool index configuration (CORESETPoolIndex) of a second control resource set j. The UE 115 may count an additional PDCCH candidate for both the first control resource set pool index configuration and the second control resource set pool index configuration.

Alternatively, the UE 115 may count an additional PDCCH candidate exclusively for the first control resource set pool index configuration or the second control resource set pool index configuration. In some examples, the UE 115 may be configured to count the additional PDCCH candidate for a control resource set pool index configuration of zero (CORESETPoolIndex=0). In some examples, if the first control resource set pool index configuration (CORESETPoolIndex) of the first control resource set i is equal to the second control resource set pool index configuration (CORESETPoolIndex) of the second control resource set j, the UE 115 may count an additional PDCCH candidate only for that control resource set pool index configuration (CORESETPoolIndex).

In some examples, the UE 115 may be configured to exclude a combined PDCCH candidate from a control resource threshold (e.g., a nonoverlapped CCE threshold). The UE 115 may perform channel estimation as part of monitoring for individual PDCCH candidates in one or multiple search space sets. In some examples, there may not be separate PDCCH DMRS scrambling identifiers (PDCCH-DMRS-ScramblingID) for the combined PDCCH candidate. If a separate PDCCH DMRS scrambling identifier (different than a PDCCH DMRS scrambling identifier for the first control resource set i and the second control resource set j), the UE 115 may be configured to count CCEs of the combined PDCCH candidate non-overlapped CCE limit.

A control resource set pool index may be configured and a combined PDCCH candidate may be for a UE-specific search space set of a primary serving cell (e.g., the base station 105). In some examples, the UE 115 may determine that a first control resource set pool index configuration (CORESETPoolIndex) of a first control resource set i is not equal to a second control resource set pool index configuration (CORESETPoolIndex) of a second control resource set j. Alternatively, the UE 115 may determine that the first control resource set pool index configuration (CORESETPoolIndex) of the first control resource set i is equal to the second control resource set pool index configuration (CORESETPoolIndex) of the second control resource set j, which may have a value of zero. As a result, the UE 115 may count the combined PDCCH candidate for overbooking because overbooking may be performed for CORESETPoolIndex=0 when per-CORESETPoolIndex threshold (also referred to as a blind decoding (BD)/CCE limit (or monitored PDCCH candidates/non-overlapped CCEs limit) is smaller than a per-cell threshold. In some examples, the UE 115 may determine that the first control resource set pool index configuration (CORESETPoolIndex) of the first control resource set i is equal to the second control resource set pool index configuration (CORESETPoolIndex) of the second control resource set j, which may have a value of one. Here, the UE 115 may not count the combined PDCCH candidate for overbooking because overbooking may be performed for CORESETPoolIndex=0 when per-CORESETPoolIndex threshold is smaller than a per-cell threshold.

In some examples, the UE 115 may manage UE-specific search space sets with respect to search space set indices for prioritization of monitored PDCCH candidates and nonoverlapped CCEs for overbooking. For example, a combined PDCCH candidate may be associated with two search space set indices. The UE 115 may be configured to support ordering for prioritization of monitored PDCCH candidates relative to regular PDCCH candidates associated with one search space set index, as well as among the combined PDCCH candidates associated with different pair of search space set indices.

The UE 115 may manage combined PDCCH candidates after regular PDCCH candidates (i.e., non-combined PDCCH candidates). In some examples, the UE 115 may be configured to manage (e.g., order) combined PDCCH candidates and regular PDCCH candidates according to search space set index pairs ($ss_N$, $ss_M$) associated with combined PDCCH candidates or a search space set index ($ss_N$) associated with regular PDCCH candidates. Table 3 shows various ordering of combined PDCCH candidates and regular PDCCH candidates based on search space set indices.

TABLE 3

PDCCH candidate ordering

| Search Space Index | PDCCH candidate Ordering {1, 2, 3, 4 (1,2), (3,1), (2,3), (1,4)} | | | | | | |
|---|---|---|---|---|---|---|---|
| 1 | 2 | 3 | 4 | (1,2) | (1,4) | (3,1) | (2,3) |
| 1 | 2 | 3 | 4 | (1,2) | (1,4) | (2,3) | (3,1) |
| 1 | 2 | 3 | 4 | (1,2) | (3,1) | (1,4) | (2,3) |
| 1 | 2 | (1,2) | 3 | (3,1) | (2,3) | 4 | (1,4) |
| 1 | (1,2) | (1,4) | 2 | (2,3) | 3 | (3,1) | 4 |
| 1 | 2 | 3 | (1,2) | 4 | (3,1) | (1,4) | (2,3) |

In some examples, among the combined PDCCH candidates (e.g. among the set of search space set pairs), the UE 115 may order each combined PDCCH candidate with respect to a smallest (or a largest) search space set index of a search space set index pair. If the smallest search space set index of a first search space set index pair is the same as the smallest search space set index of a second search space set index pair, the UE 115 may order the combined PDCCH candidates with respect to the other search space index of the search space set index pairs. Additionally or alternatively, among the combined PDCCH candidates, the UE 115 may order each combined PDCCH candidate with respect to a first search space set index of a search space set index pair. If the first search space set index of a first search space set index pair is the same as the first search space set index of a second search space set index pair, the UE 115 may order the search space set indices of the pairs with respect to the second search space set index of each pair. In s examples, among the combined PDCCH candidates, the UE 115 may order each combined PDCCH candidate with respect to a sum of indices of a search space set index pair. Additionally or alternatively, combined PDCCH candidates may have a higher priority than regular PDCCH candidates. The UE 115 may thus order jointly the combined PDCCH candidates and the regular PDCCH candidates. For regular PDCCH candidates, a search space set index is considered, while for combined PDCCH candidates if the search space set index for a regular PDCCH candidate is the same as the calculated search space set index for a combined PDCCH candidate, the UE 115 may be configured to manage the regular PDCCH candidate before the combined PDCCH candidates.

The operations performed by the base station 105 and the UE 115, for example, may provide improvements to search space operations in the wireless communications system 200. Furthermore, the operations performed by the base station 105 and the UE 115 may provide benefits and enhancements to the operation of the UE 115. For example, by supporting combined PDCCH search space operations, the UE 115 may reduce a number of PDCCH retransmission and blind decodes associated with its search space while simultaneously supporting higher reliability and lower latency communications, resulting in enhanced power efficiency and network throughput in the wireless communications system 200.

Figure 3:
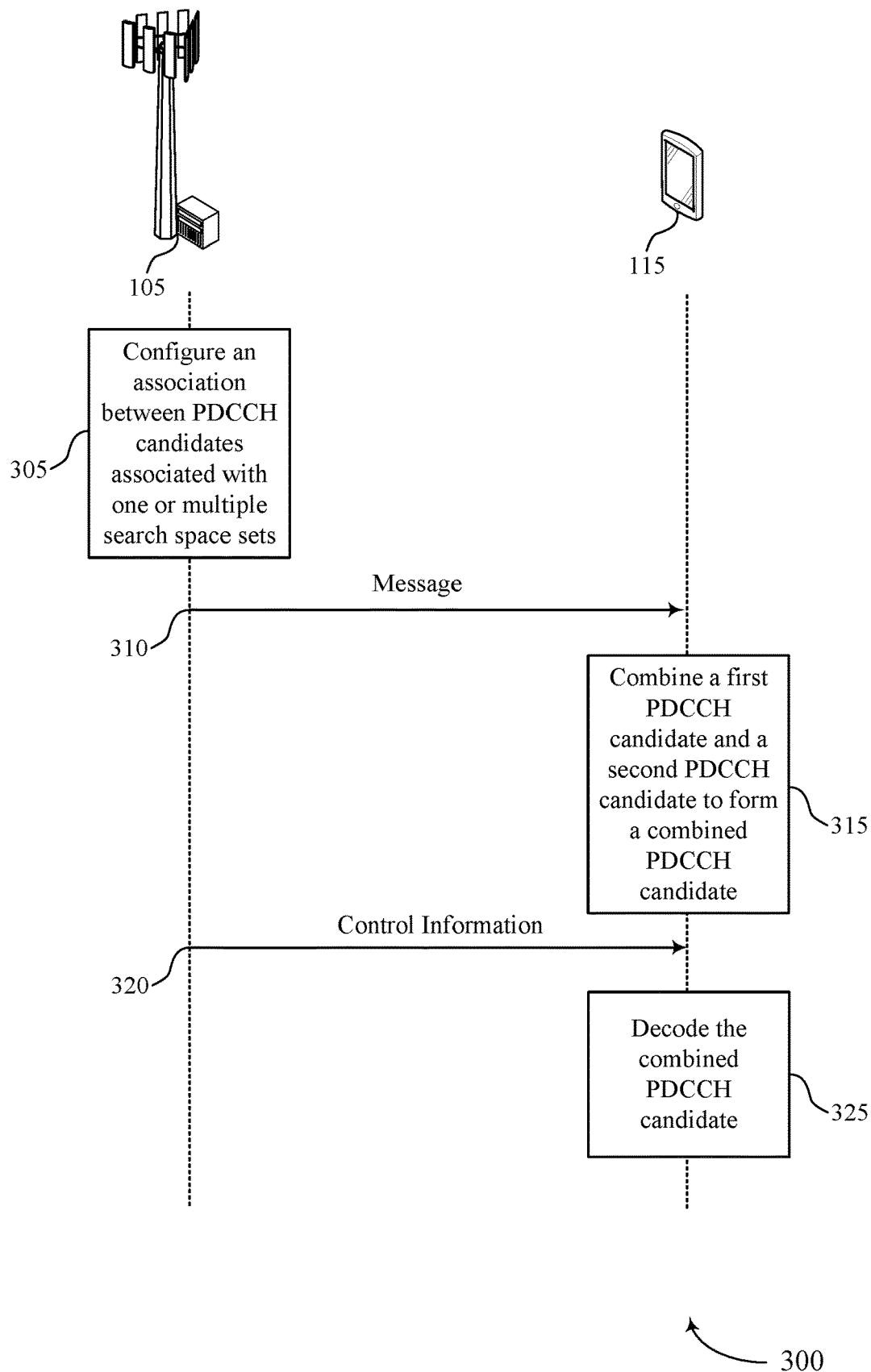
FIG. 3 illustrates an example of a process flow that supports PDCCH candidates related to PDCCH repetitions in accordance with aspects of the present disclosure.

FIG. 3 illustrates an example of a process flow 300 that supports PDCCH candidates related to PDCCH repetitions in accordance with aspects of the present disclosure. The process flow 300 may implement aspects of the wireless communications system 100 and 200 described with reference to FIGS. 1 and 2, respectively. For example, the process flow 300 may be based on a configuration by a base station 105 or a UE 115, and implemented by the UE 115, for reduced power consumption, decreased blind decoding, and improved search space utilization, and may promote low latency for wireless communications, among other benefits. The base station 105 and the UE 115 may be examples of a base station 105 and a UE 115, as described with reference to FIGS. 1 and 2. In the following description of the process flow 300, the operations between the base station 105 and the UE 115 may be transmitted in a different order than the example order shown, or the operations performed by the base station 105 and the UE 115 may be performed in different orders or at different times. Some operations may also be omitted from the process flow 300, and other operations may be added to the process flow 300.

At 305, the base station 105 may configure an association between PDCCH candidates associated with one or multiple search space sets. The one or multiple search space sets may include common search space sets or UE-specific search space sets, or both. At 310, the base station 105 may transmit a message to the UE 115, which may include an indication of the association between PDCCH candidates associated with one or multiple search space sets. In some examples, the message may be a semi-static configuration. The base station 105 may provide the semi-static configuration to the UE 115 via RRC signaling.

At 315, the UE 115 may combine a first PDCCH candidate and a second PDCCH candidate to form a combined PDCCH candidate. In some examples, the first PDCCH candidate may correspond to a first search space set and the second PDCCH candidate may correspond to a second search space set. The first search space set may be different than the second search space set. In some examples, the first search space set and the second search space set have a same search space type. For example, both the first search space set and the second search space set may be a common search space set or a UE-specific search space set. The UE 115 may assign an additional PDCCH candidate to a set of PDCCH candidates. The additional PDCCH candidate may be the combined PDCCH candidate. At 320, the base station 105 may transmit control information via PDCCH to the UE 115. At 325, the UE 115 may monitor one or multiple PDCCH candidates including the combined PDCCH candidate, and decode the combined PDCCH candidate to receive the control information.

In some examples, the UE 115 may combine the first PDCCH candidate and the second PDCCH candidate to form a combined PDCCH candidate based on a capability (i.e., UE capability) of the UE 115. For example, the UE may identify a threshold number of combined PDCCH candidates within a time interval (e.g., a PDCCH span, a slot) based on the capability of the UE 115. As such, the threshold number of combined PDCCH candidates may be per PDCCH span or slot. In some examples, the threshold number of combined PDCCH candidates may be per PDCCH span. As such, the UE 115 may decode the combined PDCCH candidate based on the set of PDCCH candidates including the additional PDCCH candidate satisfying the threshold.

The UE 115 may determine a first control resource set associated with the first search space set, and identify a first pool index configuration associated with the first control resource set. In some examples, the UE 115 may decode the combined PDCCH candidate based on the first pool index configuration. The UE 115 may determine a threshold for PDCCH candidates in the first control resource set associated with the first pool index configuration. In some examples, the UE 115 may determine a second control resource set associated with the second search space set, and identify a second pool index configuration associated with the second control resource set. The UE 115 may thus decode the combined PDCCH candidate based on the second pool index configuration. In some examples, the UE 115 may determine a threshold for PDCCH candidates in the second control resource set associated with the second pool index configuration.

In some examples, the UE 115 may determine that the first pool index configuration is different than the second pool index configuration, and assign the additional PDCCH candidate to the first pool index configuration, or the second pool index configuration, or both. In such examples, the UE 115 may decode the combined PDCCH candidate based on determining that the first pool index configuration is different than the second pool index configuration. In some other examples, the UE 115 may determine that the first pool index configuration and the second pool index configuration have a same pool index configuration, and the UE 115 may assign the additional PDCCH candidate to the first pool index configuration associated with the first control resource set or the second pool index configuration associated with the second control resource set. As such, the UE 115 may decode the combined PDCCH candidate based on determining that the first pool index configuration and the second pool index configuration having the same pool index configuration, as described in FIG. 2, respectively.

The UE 115 may also identify that the UE 115 is configured with a number of PDCCH candidates in the set of PDCCH candidates including the additional PDCCH candidate, and determine that the number of PDCCH candidates satisfies a threshold number of blind decoding PDCCH candidates for a primary serving cell (e.g., the base station 105) or a threshold number of CCEs for the primary serving cell, or both. The UE 115 may thus decode the combined PDCCH candidate based on the number of PDCCH candidates satisfying the threshold number of blind decoding PDCCH candidates for the primary serving cell or the threshold number of CCEs for the primary serving cell, or both, as described in FIG. 2, respectively. In some examples, the UE 115 may identify blind decoding PDCCH candidates in the set of PDCCH candidates or CCEs in the set of PDCCH candidates, or both associated with a common search space set, and exclude the blind decoding PDCCH candidates or the CCEs, or both associated with the common search space set from the threshold number of blind decoding PDCCH candidates for the primary serving cell or the threshold number of CCEs for the primary serving cell, or both.

In some examples, the UE 115 may identify a UE-specific search space set associated with a lowest search space index, and identify a number of blind decoding PDCCH candidates or a number of CCEs, or both associated with the UE-specific search space set. The UE 115 may decode the combined PDCCH candidate based on the number of blind decoding PDCCH candidates or the number of CCEs, or both associated with the UE-specific search space set. In some examples, the UE 115 may determine a remainder of PDCCH candidates in the set of PDCCH candidates based on the excluding, and determine a difference between the remainder of PDCCH candidates and the number of blind decoding PDCCH candidates associated with the UE-specific search space set. As a result, the UE 115 may allocate the remainder of PDCCH candidates and apply the number of blind decoding PDCCH candidates associated with the UE-specific search space set to the threshold number of blind decoding PDCCH candidates for the primary serving cell (e.g., the base station 105), as described in FIG. 2, respectively.

The UE 115 may determine that the first pool index configuration associated with the first control resource set is different than the second pool index configuration associated with the second control resource set, and determine that the combined PDCCH candidate is for a UE-specific search space associated with the primary serving cell. As such, the UE 115 may apply the combined PDCCH candidate to the threshold number of blind decoding PDCCH candidates for the primary serving cell, and decode the combined PDCCH candidate based on the applying. The combined PDCCH candidate may be counted for overbooking of PDCCH candidates for the primary serving cell. In some examples, the combined PDCCH candidate may be allocated, based on determining that the first pool index configuration associated with the first control resource set is different than the second pool index configuration associated with the second control resource set, to the UE 115 and satisfies the threshold number of PDCCH candidates for the primary serving cell.

In some other examples, the combined PDCCH candidate may be allocated, based on determining that the combined PDCCH candidate is for the UE-specific search space associated with the primary serving cell, to the UE 115 and satisfies the threshold number of PDCCH candidates for the primary serving cell.

In some examples, the UE 115 may determine that the first pool index configuration associated with the first control resource set and the second pool index configuration associated with the second control resource set have a same pool index configuration, and determine that the combined PDCCH candidate is for a UE-specific search space associated with the primary serving cell. As such, the UE 115 may decode the combined PDCCH candidate based on the UE-specific search space associated with the primary serving cell. In some examples, the UE 115 may exclude the combined PDCCH candidate from the threshold number of blind decoding PDCCH candidates for the primary serving cell based on one or more of determining that the first pool index configuration associated with the first control resource set and the second pool index configuration associated with the second control resource set have the same pool index configuration, or determining that the combined PDCCH candidate is for the UE-specific search space associated with the primary serving cell, or both. Accordingly, the combined PDCCH candidate may not be counted for overbooking of PDCCH candidates for the primary serving cell.

In some examples, the UE 115 may determine a first priority associated with a first search space set index of the combined PDCCH candidate, and determine a second priority associated with a second search space set index of the combined PDCCH candidate, as described in FIG. 2, respectively. The UE 115 may thus decode the combined PDCCH candidate based on the first priority or the second priority, or both. In some examples, the UE 115 order the combined PDCCH candidate with respect to other combined PDCCH candidates in the set of PDCCH candidates based on the first priority associated with the first search space set index or the second priority associated with the second search space set index, or both of the combined PDCCH candidate. The first search space set index or the second search space set index may be a lowest search space set index of a set of search space set indices. As such, the UE 115 may order the combined PDCCH candidate with respect to other combined PDCCH candidates in the set of PDCCH candidates based on the lowest search space set index of the combined PDCCH candidate. In some examples, the first search space set index or the second search space set index may be a highest search space set index of a set of search space set indices, and the UE 115 may order the combined PDCCH candidate with respect to other combined PDCCH candidates in the set of PDCCH candidates based on the highest search space set index of the combined PDCCH candidate.

In some examples, the UE 115 may determine a sum of the first search space set index and the second search space set index of the combined PDCCH candidate, and order the combined PDCCH candidate with respect to other combined PDCCH candidates in the set of PDCCH candidates based on the sum. The combined PDCCH candidate may be defined over one or more search space indices of a set of search space set indices. In some examples, the UE 115 may order jointly the combined PDCCH candidate and one or more individual PDCCH candidates in the set of PDCCH candidates based on corresponding search space set indices associated with the combined PDCCH candidate and search space set indices associated with the one or more individual PDCCH candidates in the set of PDCCH candidates. The search space set indices associated with the combined PDCCH candidate may have a higher priority than the search space set indices associated with the one or more individual PDCCH candidates.

The UE 115 may, in some examples, identify a PDCCH DMRS scrambling identifier associated with the combined PDCCH candidate. The PDCCH DMRS scrambling identifier associated with the combined PDCCH candidate may have a same value as a PDCCH DMRS scrambling identifier associated with the first search space set or the second search space set, or both. The UE 115 may thus decode the combined PDCCH candidate based on determining that the PDCCH DMRS scrambling identifier associated with the combined PDCCH candidate has a same value as a PDCCH DMRS scrambling identifier associated with the first search space set or the second search space set, or both. The UE 115 may refrain, in some examples, from separately counting CCEs of the combined PDCCH candidate for a nonoverlapping control channel threshold (e.g., a control resource threshold) per PDCCH span or slot. The UE 115 may determine that a PDCCH DMRS scrambling identifier associated with the combined PDCCH candidate has a different value than a PDCCH DMRS scrambling identifier associated with the set of PDCCH candidates. Here, the UE 115 may decode the combined PDCCH candidate based on determining that the PDCCH DMRS scrambling identifier associated with the combined PDCCH candidate is different than the PDCCH DMRS scrambling identifier associated with the first search space set or the second search space set, or both. The UE 115 may separately count CCEs of the combined PDCCH candidate for a nonoverlapping control channel threshold per slot.

The operations performed by the base station 105 and the UE 115 as part of, but not limited to, the process flow 300 may provide improvements to UE 115 blind decoding procedures and search space operations. Furthermore, the operations performed by the base station 105 and the UE 115 as part of, but not limited to, the process flow 300 may provide benefits and enhancements to the operation of the UE 115. For example, the described search space operations in the process flow 300 may support reduced power consumption, decreased blind decoding, among other advantages.

Figure 4:
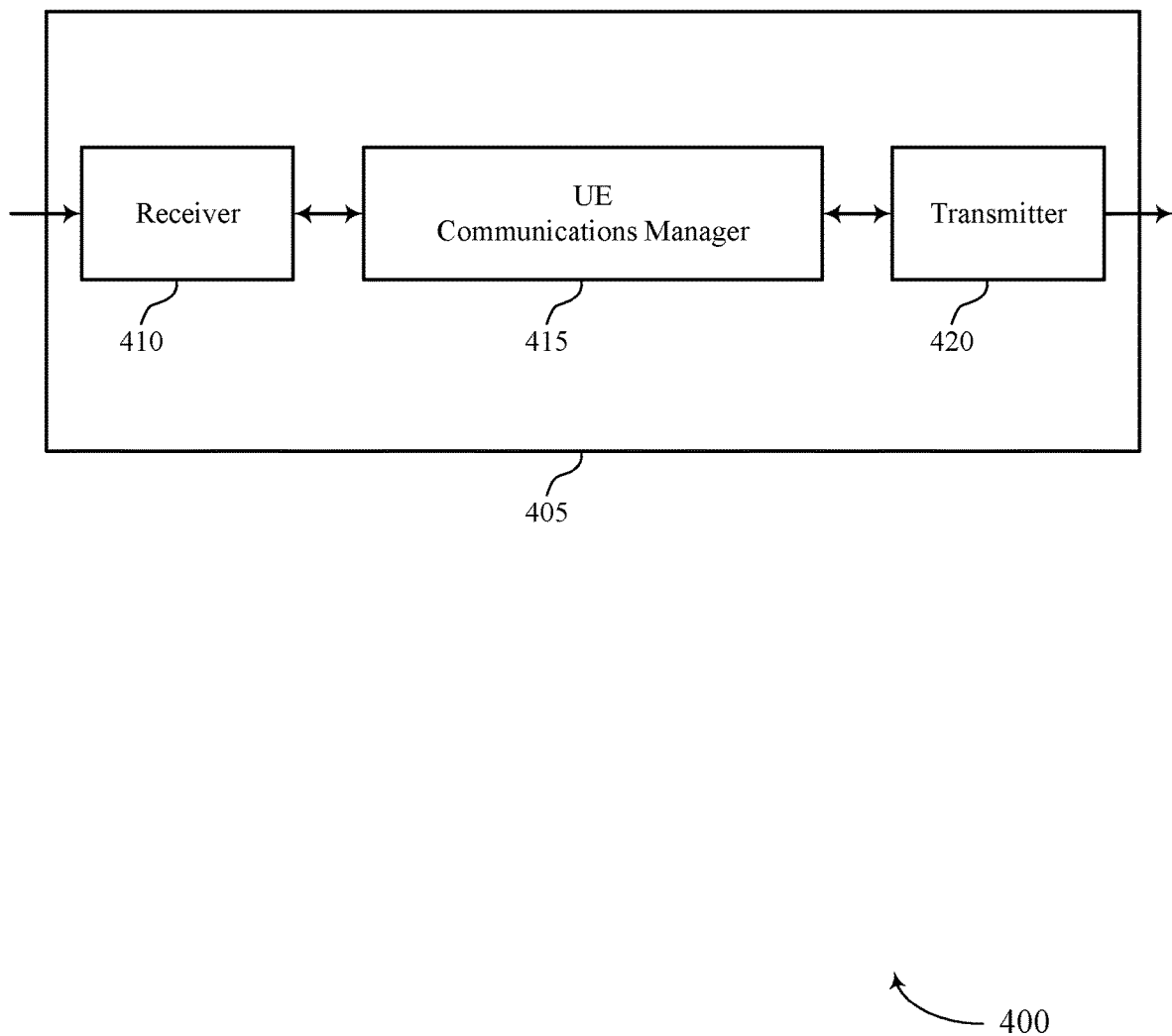
FIGS. 4 and 5 show block diagrams of devices that support PDCCH candidates related to PDCCH repetitions in accordance with aspects of the present disclosure.

FIG. 4 shows a block diagram 400 of a device 405 that supports PDCCH candidates related to PDCCH repetitions in accordance with aspects of the present disclosure. The device 405 may be an example of aspects of a UE 115 as described herein. The device 405 may include a receiver 410, a UE communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to PDCCH candidates related to PDCCH repetitions, etc.). Information may be passed on to other components of the device 405. The receiver 410 may be an example of aspects of the transceiver 720 described with reference to FIG. 7. The receiver 410 may utilize a single antenna or a set of antennas.

The UE communications manager 415 may combine a first PDCCH candidate corresponding to a first search space set and a second PDCCH candidate corresponding to a second search space set to form a combined PDCCH candidate. The UE communications manager 415 may also assign an additional PDCCH candidate to a set of PDCCH candidates, where the additional PDCCH candidate includes the combined PDCCH candidate. The UE communications manager 415 may decode the combined PDCCH candidate based on the assigning. The UE communications manager 415 may be an example of aspects of the UE communications manager 710 described herein.

The UE communications manager 415 as described may be implemented as an integrated circuit or chipset for a mobile device modem, and the receiver 410 and transmitter 420 may be implemented as analog components (e.g., amplifiers, filters, antennas) coupled with the mobile device modem to enable wireless transmission and reception over one or more bands. The UE communications manager 415 may as described herein be implemented to realize one or more potential advantages. One implementation may allow the device 405 to save power and increase battery life by communicating with a base station 105 (as shown in FIGS. 1 through 3) more efficiently. For example, the device 405 may reduce retransmissions of control information by extending a number of PDCCH candidates associated with a search space. In addition, the device 405 may experience reduced complexity, better throughput through faster blind decoding operations. Another implementation may promote higher reliability and lower latency communications at the device 405 due to control channel (e.g., PDCCH) scheduling flexibility of the device 405, as a result of supporting combined PDCCH candidates.

The UE communications manager 415, or its sub-components, may be implemented in hardware, code (e.g., software or firmware) executed by a processor, or any combination thereof. If implemented in code executed by a processor, the functions of the UE communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 415, or its sub-components, may be physically located at various positions, including being distributed such that portions of functions are implemented at different physical locations by one or more physical components. In some examples, the UE communications manager 415, or its sub-components, may be a separate and distinct component in accordance with various aspects of the present disclosure. In some examples, the UE communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
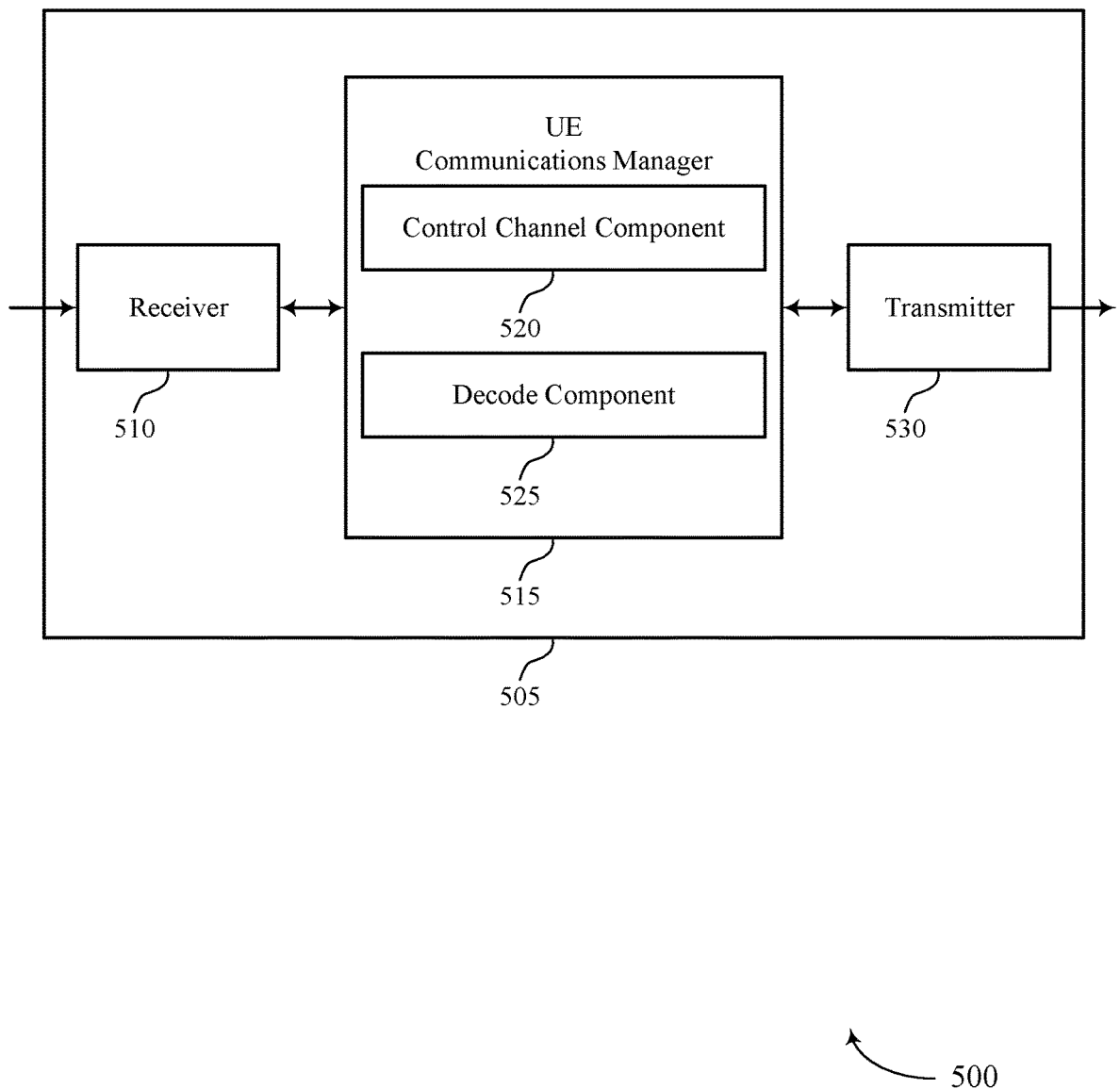

FIG. 5 shows a block diagram 500 of a device 505 that supports PDCCH candidates related to PDCCH repetitions in accordance with aspects of the present disclosure. The device 505 may be an example of aspects of a device 405, or a UE 115 as described herein. The device 505 may include a receiver 510, a UE communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to PDCCH candidates related to PDCCH repetitions, etc.). Information may be passed on to other components of the device 505. The receiver 510 may be an example of aspects of the transceiver 720 described with reference to FIG. 7. The receiver 510 may utilize a single antenna or a set of antennas.

The UE communications manager 515 may be an example of aspects of the UE communications manager 415 as described herein. The UE communications manager 515 may include a control channel component 520 and a decode component 525. The UE communications manager 515 may be an example of aspects of the UE communications manager 710 described herein. The control channel component 520 may combine a first PDCCH candidate corresponding to a first search space set and a second PDCCH candidate corresponding to a second search space set to form a combined PDCCH candidate and assign an additional PDCCH candidate to a set of PDCCH candidates, where the additional PDCCH candidate includes the combined PDCCH candidate. The decode component 525 may decode the combined PDCCH candidate based on the assigning.

The transmitter 530 may transmit signals generated by other components of the device 505. In some examples, the transmitter 530 may be collocated with a receiver 510 in a transceiver component. For example, the transmitter 530 may be an example of aspects of the transceiver 720 described with reference to FIG. 7. The transmitter 530 may utilize a single antenna or a set of antennas.

Figure 6:
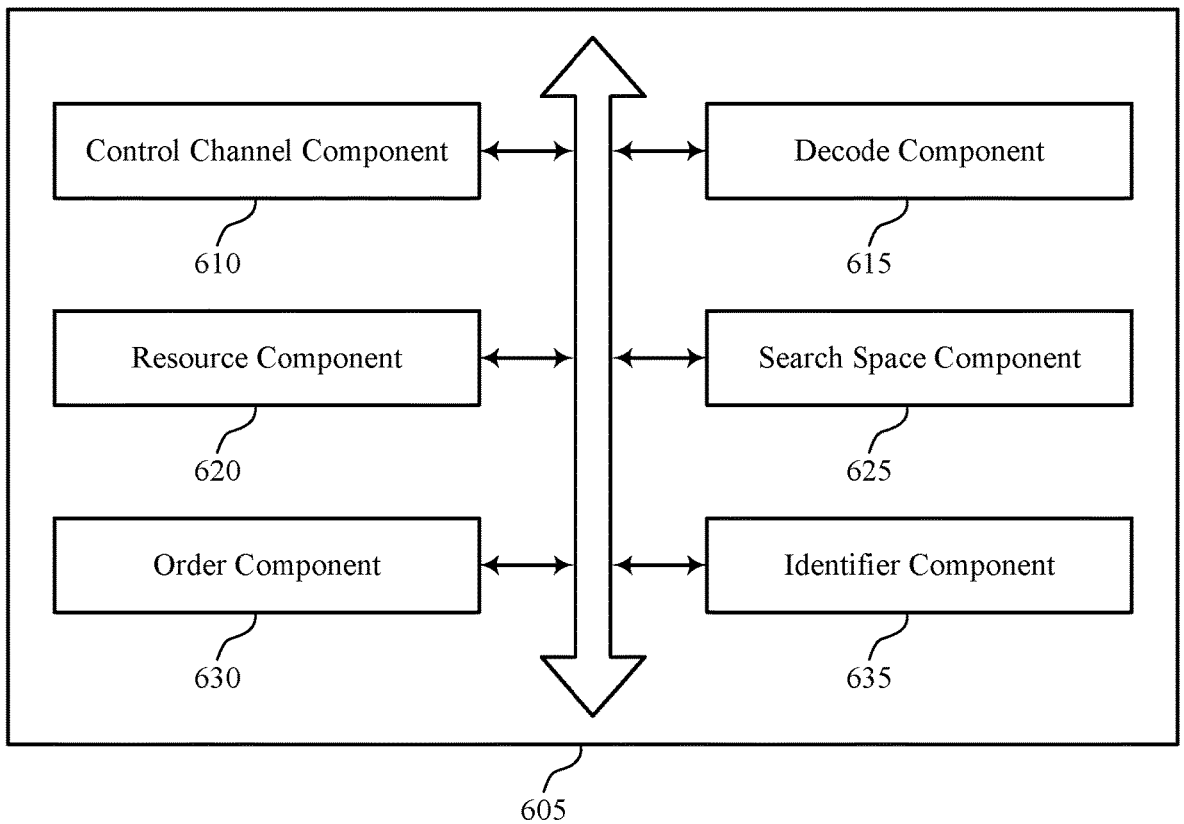
FIG. 6 shows a block diagram of a UE communications manager that supports PDCCH candidates related to PDCCH repetitions in accordance with aspects of the present disclosure.

FIG. 6 shows a block diagram 600 of a UE communications manager 605 that supports PDCCH candidates related to PDCCH repetitions in accordance with aspects of the present disclosure. The UE communications manager 605 may be an example of aspects of a UE communications manager 415, a UE communications manager 515, or a UE communications manager 710 described herein. The UE communications manager 605 may include a control channel component 610, a decode component 615, a resource component 620, a search space component 625, an order component 630, and an identifier component 635. Each of these component may communicate, directly or indirectly, with one another (e.g., via one or more buses).

The control channel component 610 may combine a first PDCCH candidate corresponding to a first search space set and a second PDCCH candidate corresponding to a second search space set to form a combined PDCCH candidate. In some examples, the control channel component 610 may assign an additional PDCCH candidate to a set of PDCCH candidates. The additional PDCCH candidate includes the combined PDCCH candidate. In some examples, the control channel component 610 may identify that the UE is configured with a number of PDCCH candidates in the set of PDCCH candidates including the additional PDCCH candidate. The control channel component 610 may determine that the number of PDCCH candidates satisfies a threshold number of blind decoding PDCCH candidates for a primary serving cell or a threshold number of CCEs for the primary serving cell, or both where monitoring the combined PDCCH candidate is based on the number of PDCCH candidates satisfying the threshold number of blind decoding PDCCH candidates for the primary serving cell or the threshold number of CCEs for the primary serving cell, or both.

The control channel component 610 may identify blind decoding PDCCH candidates in the set of PDCCH candidates or CCEs in the set of PDCCH candidates, or both associated with a common search space set. In some examples, the control channel component 610 may exclude the blind decoding PDCCH candidates or the CCEs, or both associated with the common search space set from the threshold number of blind decoding PDCCH candidates for the primary serving cell or the threshold number of CCEs for the primary serving cell, or both. In some examples, the control channel component 610 may combine the first PDCCH candidate and the second PDCCH candidate based on a capability of the UE.

In some cases, the combined PDCCH candidate is defined over one or more search space indices of a set of search space set indices. In some cases, the first search space set is different than the second search space set. In some cases, a threshold number of combined PDCCH candidates within a time interval are based on the capability of the UE. In some cases, a threshold number of combined PDCCH candidates are per slot. In some cases, a threshold number of combined PDCCH candidates are per PDCCH span. In some cases, the first search space set and the second search space set have a same search space type.

The decode component 615 may decode the combined PDCCH candidate based on the assigning. In some examples, the decode component 615 may determine that the set of PDCCH candidates including the additional PDCCH candidate, the first PDCCH candidate, the second PDCCH candidate, and the combined PDCCH candidate satisfies a threshold satisfies a threshold, the threshold including a threshold number of PDCCH candidates within a time interval, where monitoring the combined PDCCH candidate is based on the set of PDCCH candidates including the additional PDCCH candidate satisfying the threshold. The resource component 620 may determine a first control resource set associated with the first search space set. In some examples, the resource component 620 may identify a first pool index configuration associated with the first control resource set, where monitoring the combined PDCCH candidate is based on the first pool index configuration. In some examples, the resource component 620 may determine a threshold for PDCCH candidates in the first control resource set associated with the first pool index configuration.

The resource component 620 may determine a second control resource set associated with the second search space set. In some examples, the resource component 620 may identify a second pool index configuration associated with the second control resource set, where monitoring the combined PDCCH candidate is based on the second pool index configuration. In some examples, the resource component 620 may determine a threshold for PDCCH candidates in the second control resource set associated with the second pool index configuration. The resource component 620 may determine that the first pool index configuration is different than the second pool index configuration.

In some examples, the resource component 620 may assign the additional PDCCH candidate to the first pool index configuration, or the second pool index configuration, or both, where monitoring the combined PDCCH candidate is based on determining that the first pool index configuration is different than the second pool index configuration. In some examples, the resource component 620 may determine that the first pool index configuration and the second pool index configuration have a same pool index configuration. In some examples, the resource component 620 may assign the additional PDCCH candidate to the first pool index configuration associated with the first control resource set or the second pool index configuration associated with the second control resource set, where monitoring the combined PDCCH candidate is based on determining that the first pool index configuration and the second pool index configuration have the same pool index configuration.

The search space component 625 may identify a UE-specific search space set associated with a lowest search space index. In some examples, the search space component 625 may identify a number of blind decoding PDCCH candidates or a number of CCEs, or both associated with the UE-specific search space set, where monitoring the combined PDCCH candidate is based on the number of blind decoding PDCCH candidates or the number of CCEs, or both associated with the UE-specific search space set. In some examples, the search space component 625 may determine a remainder of PDCCH candidates in the set of PDCCH candidates based on the excluding. In some examples, the search space component 625 may determine a difference between the remainder of PDCCH candidates and the number of blind decoding PDCCH candidates associated with the UE-specific search space set. In some examples, the search space component 625 may allocate the remainder of PDCCH candidates and applying the number of blind decoding PDCCH candidates associated with the UE-specific search space set to the threshold number of blind decoding PDCCH candidates for the primary serving cell.

In some examples, the search space component 625 may determine that the first pool index configuration associated with the first control resource set is different than the second pool index configuration associated with the second control resource set. In some examples, the search space component 625 may determine that the combined PDCCH candidate is for a UE-specific search space associated with the primary serving cell. In some examples, the search space component 625 may apply the combined PDCCH candidate to the threshold number of blind decoding PDCCH candidates for the primary serving cell, where monitoring the combined PDCCH candidate is based on the applying.

In some examples, the search space component 625 may determine that the first pool index configuration associated with the first control resource set and the second pool index configuration associated with the second control resource set have a same pool index configuration. In some examples, the search space component 625 may determine that the combined PDCCH candidate is for a UE-specific search space associated with the primary serving cell, where monitoring the combined PDCCH candidate is based on the UE-specific search space associated with the primary serving cell. In some examples, the search space component 625 may exclude the combined PDCCH candidate from the threshold number of blind decoding PDCCH candidates for the primary serving cell based on one or more of that the first pool index configuration associated with the first control resource set and the second pool index configuration associated with the second control resource set have the same pool index configuration, or that the combined PDCCH candidate is for the UE-specific search space associated with the primary serving cell, or both. In some cases, the combined PDCCH candidate is counted for overbooking of PDCCH candidates for the primary serving cell.

In some cases, the combined PDCCH candidate is allocated, based on determining that the first pool index configuration associated with the first control resource set is different than the second pool index configuration associated with the second control resource set, to the UE and satisfies the threshold number of PDCCH candidates for the primary serving cell. In some cases, the combined PDCCH candidate is allocated, based on determining that the combined PDCCH candidate is for the UE-specific search space associated with the primary serving cell, to the UE and satisfies the threshold number of PDCCH candidates for the primary serving cell. In some cases, the combined PDCCH candidate is not counted for overbooking of PDCCH candidates for the primary serving cell.

The order component 630 may determine a first priority associated with a first search space set index of the combined PDCCH candidate. In some examples, the order component 630 may determine a second priority associated with a second search space set index of the combined PDCCH candidate, where monitoring the combined PDCCH candidate is based on the first priority or the second priority, or both. In some examples, the order component 630 may order the combined PDCCH candidate with respect to other combined PDCCH candidates in the set of PDCCH candidates based on the first priority associated with the first search space set index or the second priority associated with the second search space set index, or both of the combined PDCCH candidate. In some examples, the order component 630 may determine a sum of the first search space set index and the second search space set index of the combined PDCCH candidate, where ordering the combined PDCCH candidate with respect to other combined PDCCH candidates in the set of PDCCH candidates is based on the sum.

In some examples, the order component 630 may order jointly the combined PDCCH candidate and one or more PDCCH candidates in the set of PDCCH candidates based on corresponding search space set indices associated with the combined PDCCH candidate and search space set indices associated with the one or more PDCCH candidates in the set of PDCCH candidates. In some examples, the order component 630 may order the combined PDCCH candidate based on a sum of search space indices of the combined PDCCH candidate. In some cases, the first search space set index or the second search space set index is a lowest search space set index of a set of search space set indices, where ordering the combined PDCCH candidate with respect to other combined PDCCH candidates in the set of PDCCH candidates is based on the lowest search space set index of the combined PDCCH candidate. In some cases, the first search space set index or the second search space set index is a highest search space set index of a set of search space set indices, where ordering the combined PDCCH candidate with respect to other combined PDCCH candidates in the set of PDCCH candidates is based on the highest search space set index of the combined PDCCH candidate. In some cases, the search space set indices associated with the combined PDCCH candidate have a higher priority than the search space set indices associated with the one or more PDCCH candidates.

The identifier component 635 may identify a PDCCH DMRS scrambling identifier associated with the combined PDCCH candidate, where the PDCCH DMRS scrambling identifier associated with the combined PDCCH candidate has a same value as a PDCCH demodulation reference signal scrambling identifier associated with the first search space set or the second search space set, or both. In some examples, the identifier component 635 may refrain from separately counting CCEs of the combined PDCCH candidate for a nonoverlapping control channel threshold per slot. In some examples, the identifier component 635 may determine that a PDCCH DMRS scrambling identifier associated with the combined PDCCH candidate has a different value than a PDCCH DMRS scrambling identifier associated with the set of PDCCH candidates. In some examples, the identifier component 635 may decode the combined PDCCH candidate is based on determining that the PDCCH DMRS scrambling identifier associated with the combined PDCCH candidate is different than the PDCCH DMRS scrambling identifier associated with the first search space set or the second search space set, or both. In some examples, the identifier component 635 may separately count CCEs of the combined PDCCH candidate for a nonoverlapping control channel threshold per slot.

Figure 7:
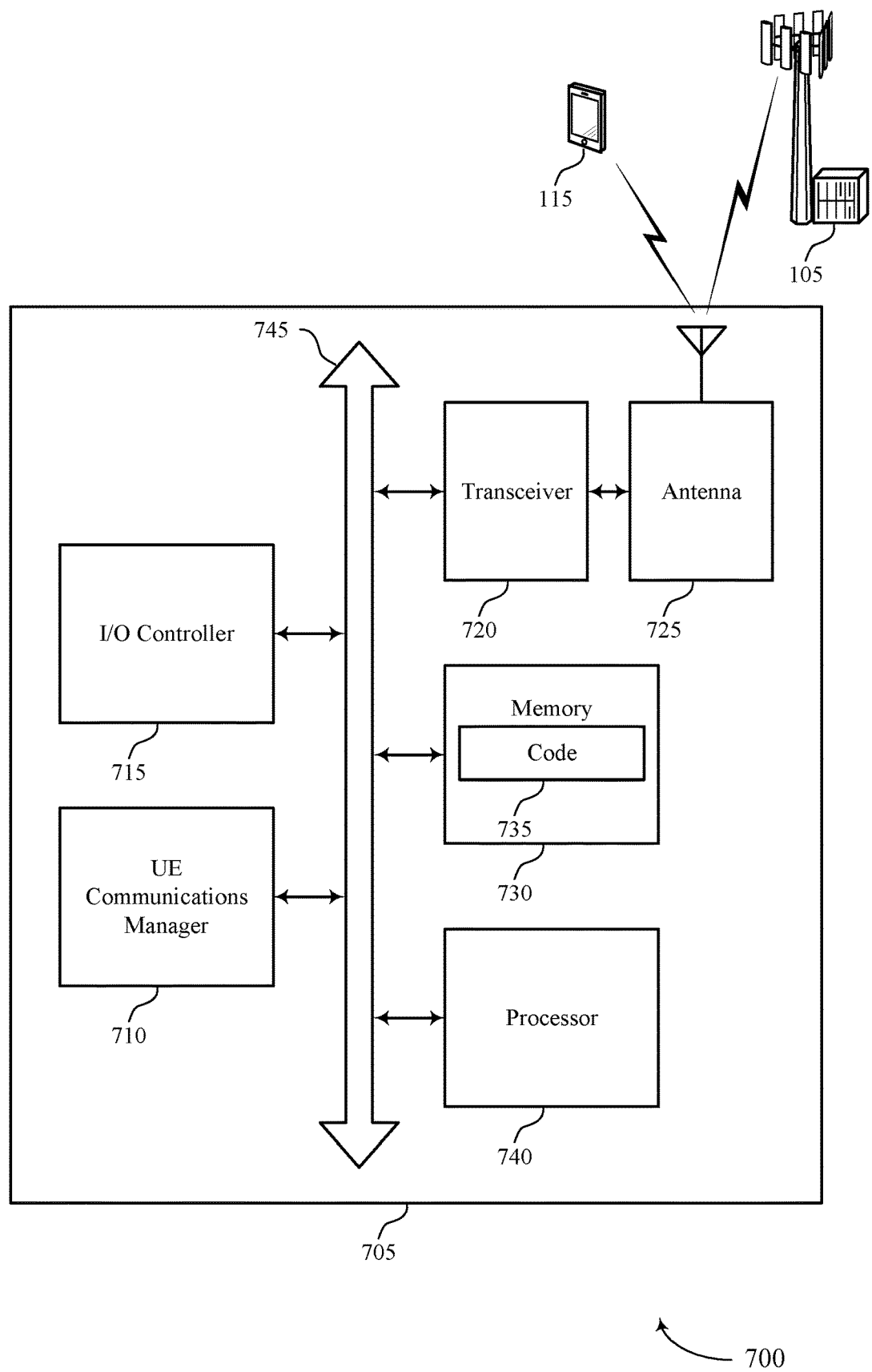
FIG. 7 shows a diagram of a system including a device that supports PDCCH candidates related to PDCCH repetitions in accordance with aspects of the present disclosure.

FIG. 7 shows a diagram of a system 700 including a device 705 that supports PDCCH candidates related to PDCCH repetitions in accordance with aspects of the present disclosure. The device 705 may be an example of or include the components of device 405, device 505, or a UE 115 as described herein. The device 705 may include components for bi-directional voice and data communications including components for transmitting and receiving communications, including a UE communications manager 710, an I/O controller 715, a transceiver 720, an antenna 725, memory 730, and a processor 740. These components may be in electronic communication via one or more buses (e.g., bus 745).

The UE communications manager 710 may combine a first PDCCH candidate corresponding to a first search space set and a second PDCCH candidate corresponding to a second search space set to form a combined PDCCH candidate. The UE communications manager 710 may assign an additional PDCCH candidate to a set of PDCCH candidates, where the additional PDCCH candidate includes the combined PDCCH candidate. The UE communications manager 710 may decode the combined PDCCH candidate based on the assigning.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some examples, the device 705 may include a single antenna 725. However, in some examples, the device 705 may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting PDCCH candidates related to PDCCH repetitions).

Figure 8:
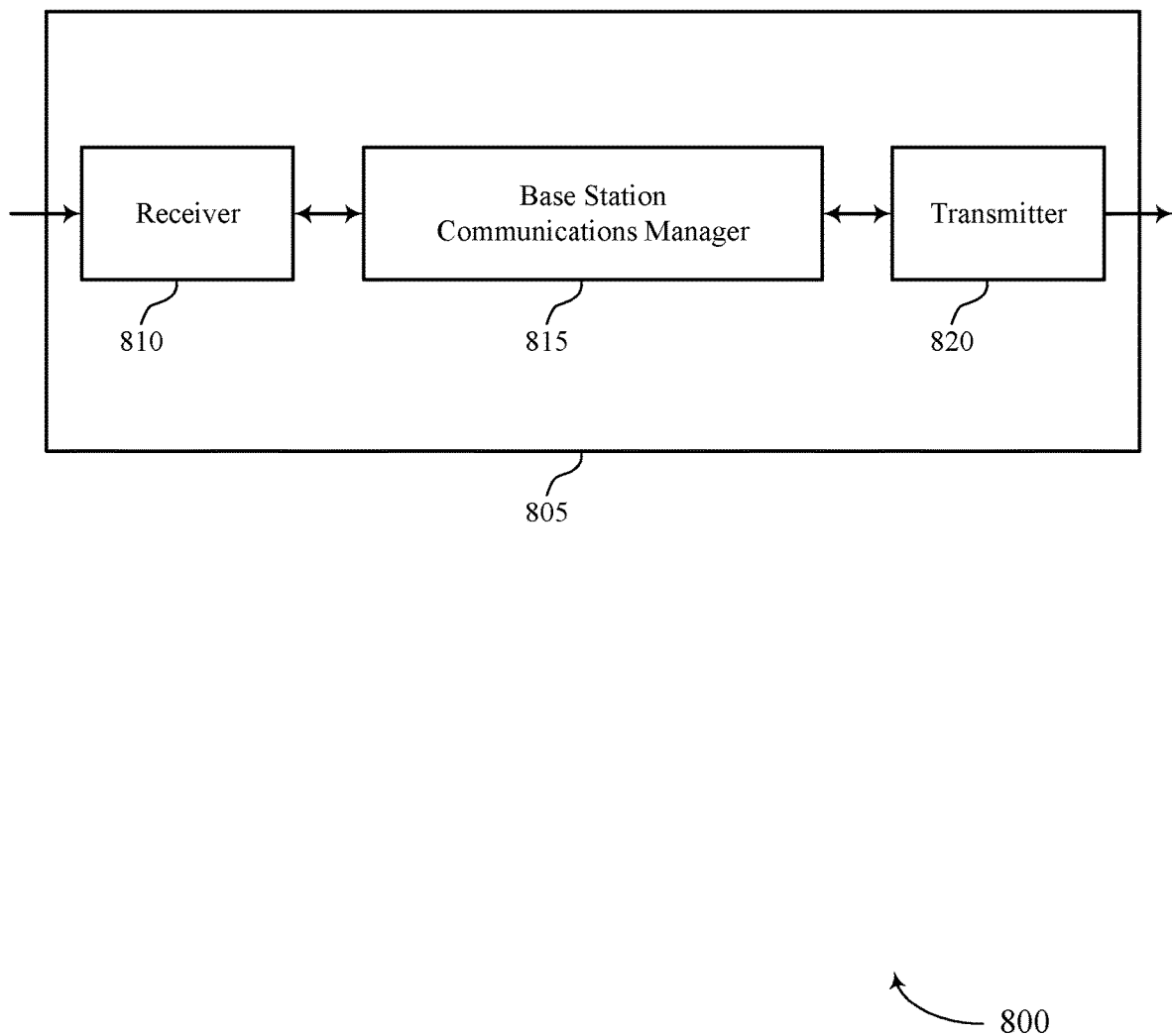
FIGS. 8 and 9 show block diagrams of devices that support PDCCH candidates related to PDCCH repetitions in accordance with aspects of the present disclosure.

FIG. 8 shows a block diagram 800 of a device 805 that supports PDCCH candidates related to PDCCH repetitions in accordance with aspects of the present disclosure. The device 805 may be an example of aspects of a base station 105 as described herein. The device 805 may include a receiver 810, a base station communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to PDCCH candidates related to PDCCH repetitions, etc.). Information may be passed on to other components of the device 805. The receiver 810 may be an example of aspects of the transceiver 1120 described with reference to FIG. 11. The receiver 810 may utilize a single antenna or a set of antennas.

The base station communications manager 815 may configure an association between a first PDCCH candidate corresponding to a first search space set and a second PDCCH candidate corresponding to a second search space set to form a combined PDCCH candidate. The base station communications manager 815 may transmit an indication of the association between the first PDCCH candidate and the second PDCCH candidate. The base station communications manager 815 may be an example of aspects of the base station communications manager 1110 described herein.

The base station communications manager 815, or its sub-components, may be implemented in hardware, code (e.g., software or firmware) executed by a processor, or any combination thereof. If implemented in code executed by a processor, the functions of the base station communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 815, or its sub-components, may be physically located at various positions, including being distributed such that portions of functions are implemented at different physical locations by one or more physical components. In some examples, the base station communications manager 815, or its sub-components, may be a separate and distinct component in accordance with various aspects of the present disclosure. In some examples, the base station communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
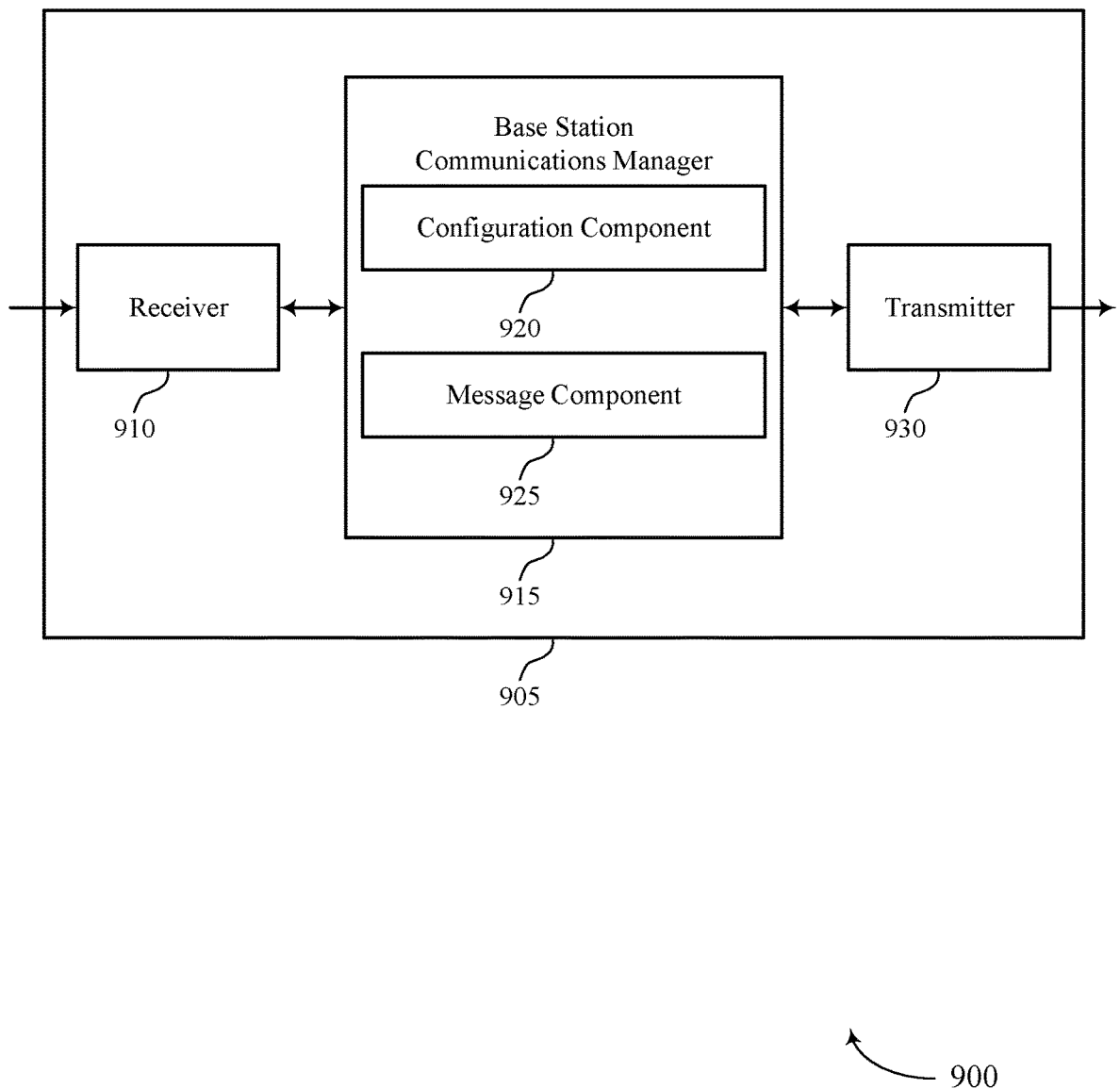

FIG. 9 shows a block diagram 900 of a device 905 that supports PDCCH candidates related to PDCCH repetitions in accordance with aspects of the present disclosure. The device 905 may be an example of aspects of a device 805, or a base station 105 as described herein. The device 905 may include a receiver 910, a base station communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to PDCCH candidates related to PDCCH repetitions, etc.). Information may be passed on to other components of the device 905. The receiver 910 may be an example of aspects of the transceiver 1120 described with reference to FIG. 11. The receiver 910 may utilize a single antenna or a set of antennas.

The base station communications manager 915 may be an example of aspects of the base station communications manager 815 as described herein. The base station communications manager 915 may include a configuration component 920 and a message component 925. The base station communications manager 915 may be an example of aspects of the base station communications manager 1110 described herein. The configuration component 920 may configure an association between a first PDCCH candidate corresponding to a first search space set and a second PDCCH candidate corresponding to a second search space set to form a combined PDCCH candidate. The message component 925 may transmit an indication of the association between the first PDCCH candidate and the second PDCCH candidate.

The transmitter 930 may transmit signals generated by other components of the device 905. In some examples, the transmitter 930 may be collocated with a receiver 910 in a transceiver component. For example, the transmitter 930 may be an example of aspects of the transceiver 1120 described with reference to FIG. 11. The transmitter 930 may utilize a single antenna or a set of antennas.

Figure 10:
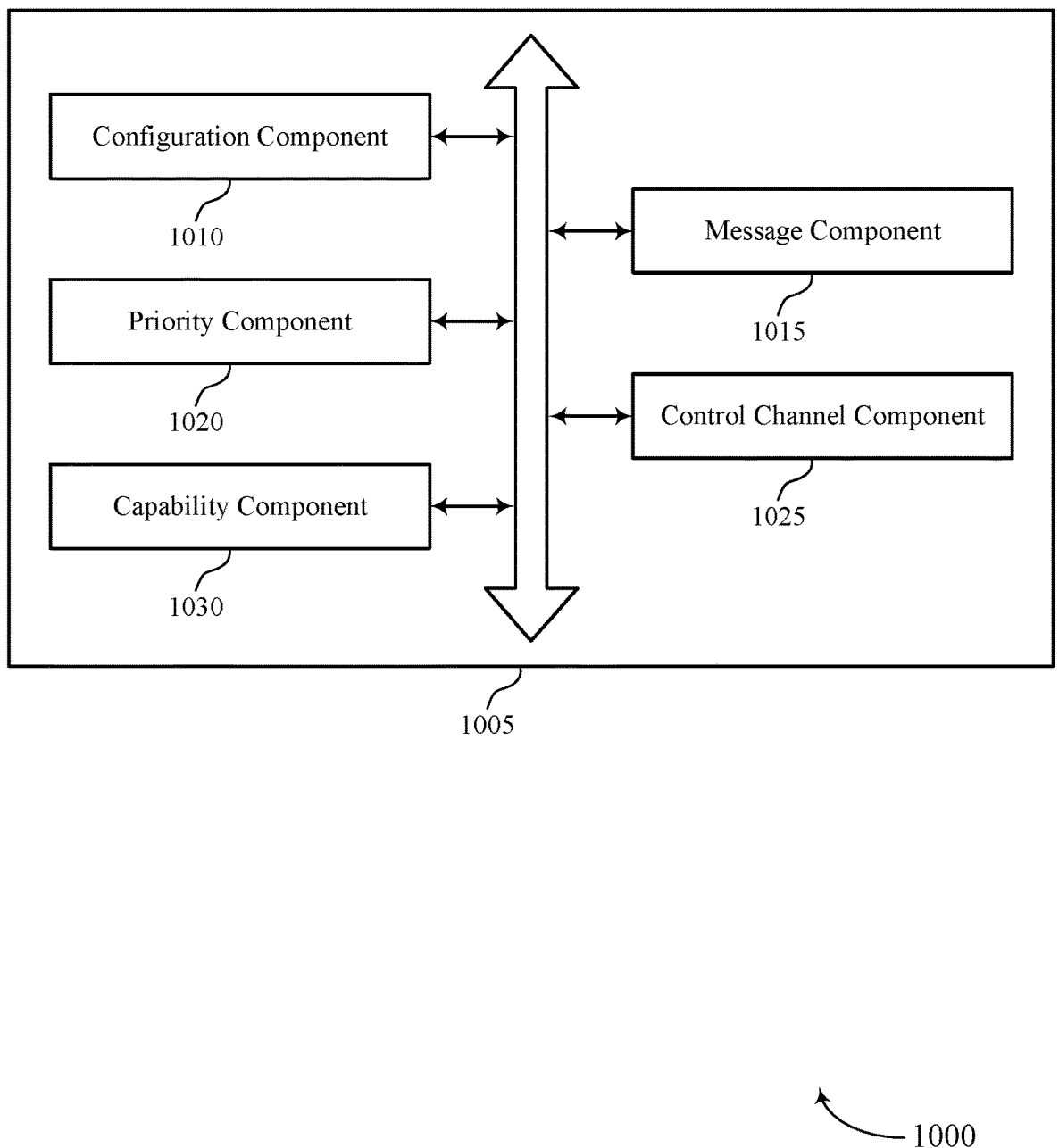
FIG. 10 shows a block diagram of a base station communications manager that supports PDCCH candidates related to PDCCH repetitions in accordance with aspects of the present disclosure.

FIG. 10 shows a block diagram 1000 of a base station communications manager 1005 that supports PDCCH candidates related to PDCCH repetitions in accordance with aspects of the present disclosure. The base station communications manager 1005 may be an example of aspects of a base station communications manager 815, a base station communications manager 915, or a base station communications manager 1110 described herein. The base station communications manager 1005 may include a configuration component 1010, a message component 1015, a priority component 1020, a control channel component 1025, and a capability component 1030. Each of these components may communicate, directly or indirectly, with one another (e.g., via one or more buses).

The configuration component 1010 may configure an association between a first PDCCH candidate corresponding to a first search space set and a second PDCCH candidate corresponding to a second search space set to form a combined PDCCH candidate. In some cases, the first search space set is different than the second search space set. In some cases, a first control resource set associated with the first search space set has a different pool index configuration than a second control resource set associated with the second search space set. In some cases, a first control resource set associated with the first search space set and a second control resource set associated with the second search space set have a same pool index configuration. In some cases, the first search space set and the second search space set have a same search space type.

The message component 1015 may transmit an indication of the association between the first PDCCH candidate and the second PDCCH candidate. The priority component 1020 may configure a priority between the first PDCCH candidate corresponding to the first search space set and the second PDCCH candidate corresponding to the second search space set. In some examples, the priority component 1020 may transmit a second indication of the priority between the first PDCCH candidate corresponding to the first search space set and the second PDCCH candidate corresponding to the second search space set.

The control channel component 1025 may allocate PDCCH candidates to a set of PDCCH candidates. In some examples, the control channel component 1025 may transmit a second indication of the allocated PDCCH candidates of the set of PDCCH candidates. The capability component 1030 may receive a UE capability. In some examples, the capability component 1030 may configure a threshold number of combined PDCCH candidates within a time interval based on the UE capability. In some examples, the capability component 1030 may transmit a second indication of the threshold number of combined PDCCH candidates. In some cases, a threshold number of PDCCH candidates within the time interval are per slot. In some cases, a threshold number of PDCCH candidates within the time interval are per PDCCH span.

Figure 11:
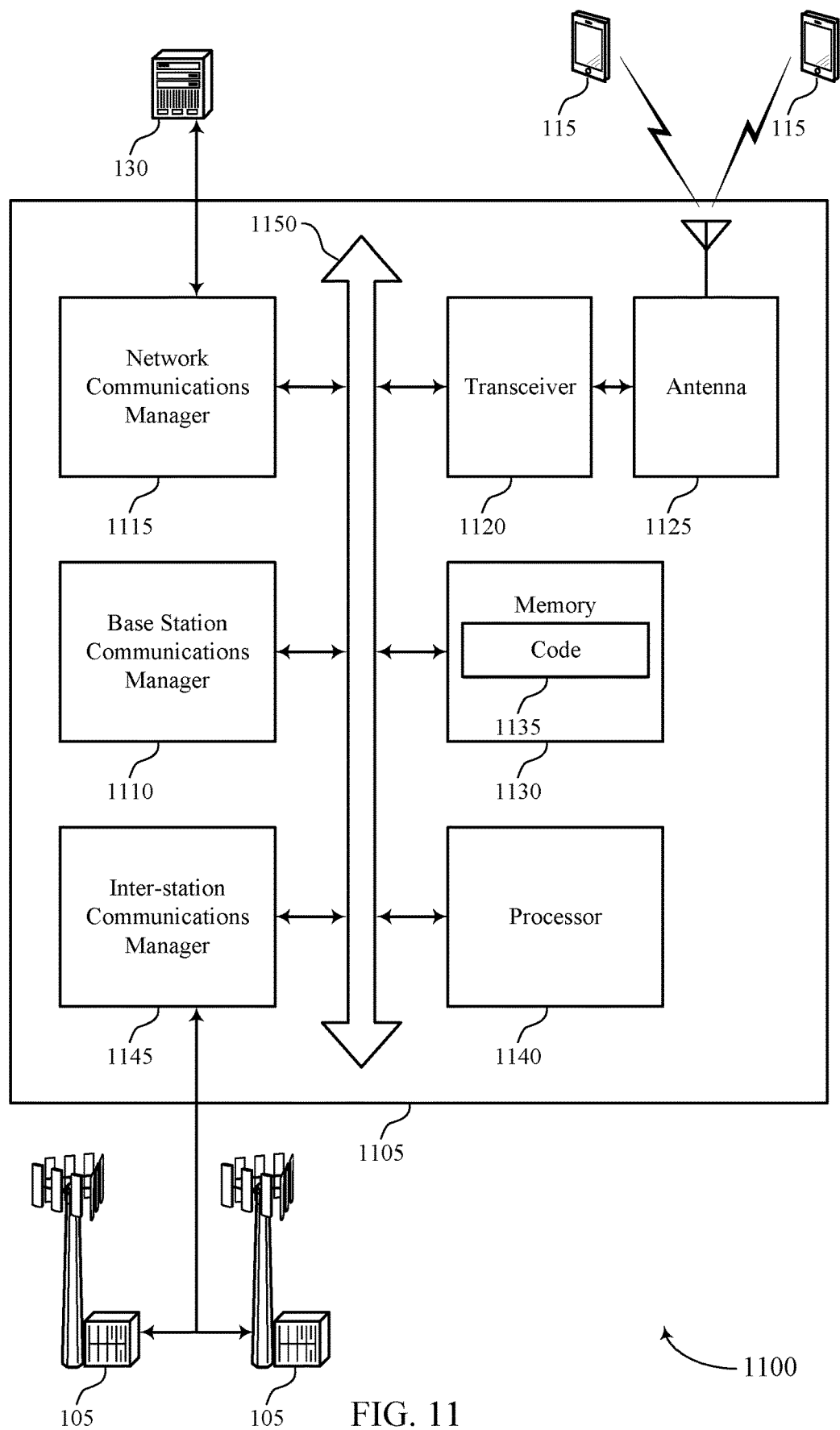
FIG. 11 shows a diagram of a system including a device that supports PDCCH candidates related to PDCCH repetitions in accordance with aspects of the present disclosure.

FIG. 11 shows a diagram of a system 1100 including a device 1105 that supports PDCCH candidates related to PDCCH repetitions in accordance with aspects of the present disclosure. The device 1105 may be an example of or include the components of device 805, device 905, or a base station 105 as described herein. The device 1105 may include components for bi-directional voice and data communications including components for transmitting and receiving communications, including a base station communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The base station communications manager 1110 may configure an association between a first PDCCH candidate corresponding to a first search space set and a second PDCCH candidate corresponding to a second search space set to form a combined PDCCH candidate. The base station communications manager 1110 may transmit an indication of the association between the first PDCCH candidate and the second PDCCH candidate.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some examples, the device 1105 may include a single antenna 1125. However, in some examples, the device 1105 may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting PDCCH candidates related to PDCCH repetitions).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

Figure 12:
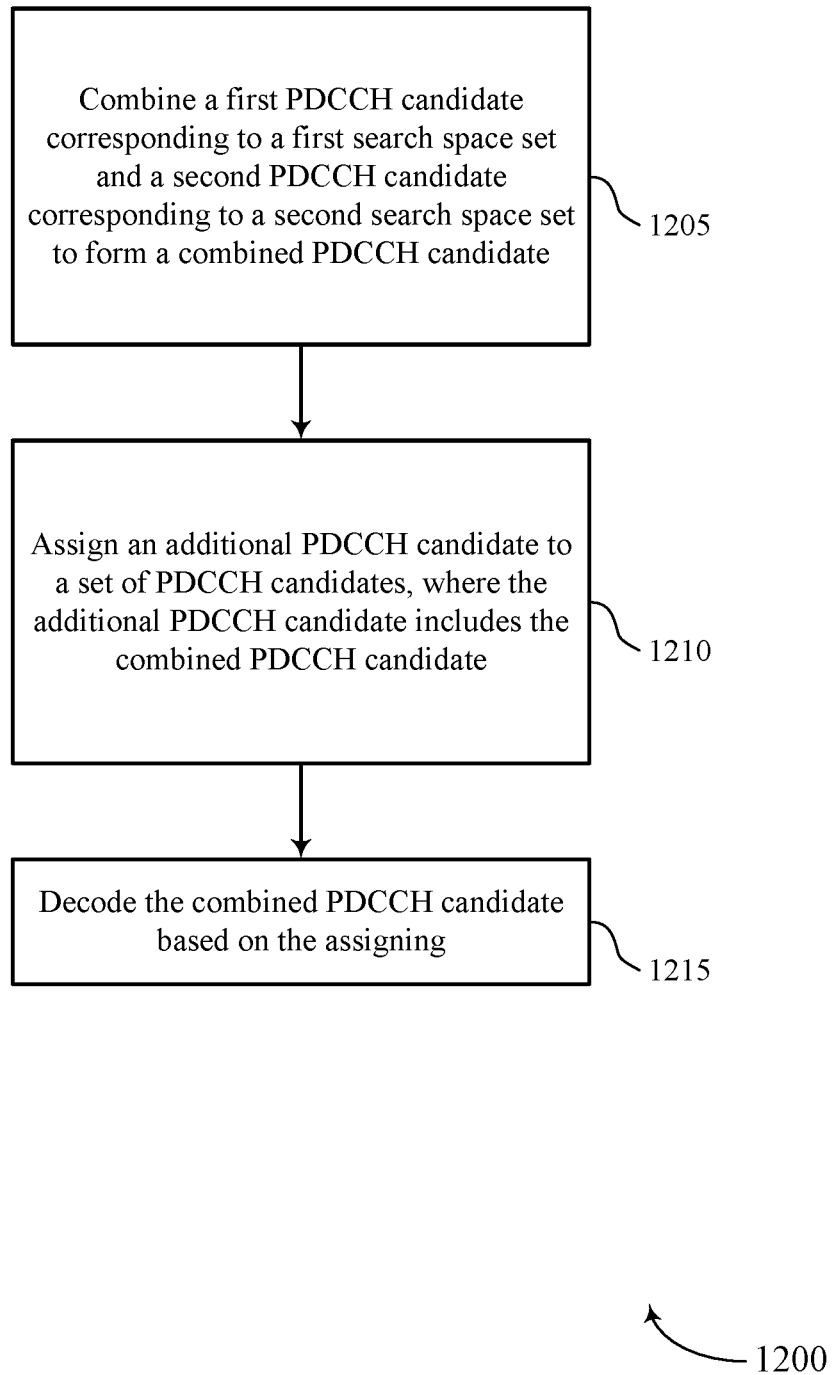
FIGS. 12 through 16 show flowcharts illustrating methods that support PDCCH candidates related to PDCCH repetitions in accordance with aspects of the present disclosure.

FIG. 12 shows a flowchart illustrating a method 1200 that supports PDCCH candidates related to PDCCH repetitions in accordance with aspects of the present disclosure. The operations of method 1200 may be implemented by a UE 115 or its components as described herein. For example, the operations of method 1200 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may combine a first PDCCH candidate corresponding to a first search space set and a second PDCCH candidate corresponding to a second search space set to form a combined PDCCH candidate. The operations of 1205 may be performed according to the methods described herein. In some examples, aspects of the operations of 1205 may be performed by a control channel component as described with reference to FIGS. 4 through 7.

At 1210, the UE may assign an additional PDCCH candidate to a set of PDCCH candidates, where the additional PDCCH candidate includes the combined PDCCH candidate. The operations of 1210 may be performed according to the methods described herein. In some examples, aspects of the operations of 1210 may be performed by a control channel component as described with reference to FIGS. 4 through 7.

At 1215, the UE may decode the combined PDCCH candidate based on the assigning. The operations of 1215 may be performed according to the methods described herein. In some examples, aspects of the operations of 1215 may be performed by a decode component as described with reference to FIGS. 4 through 7.

Figure 13:
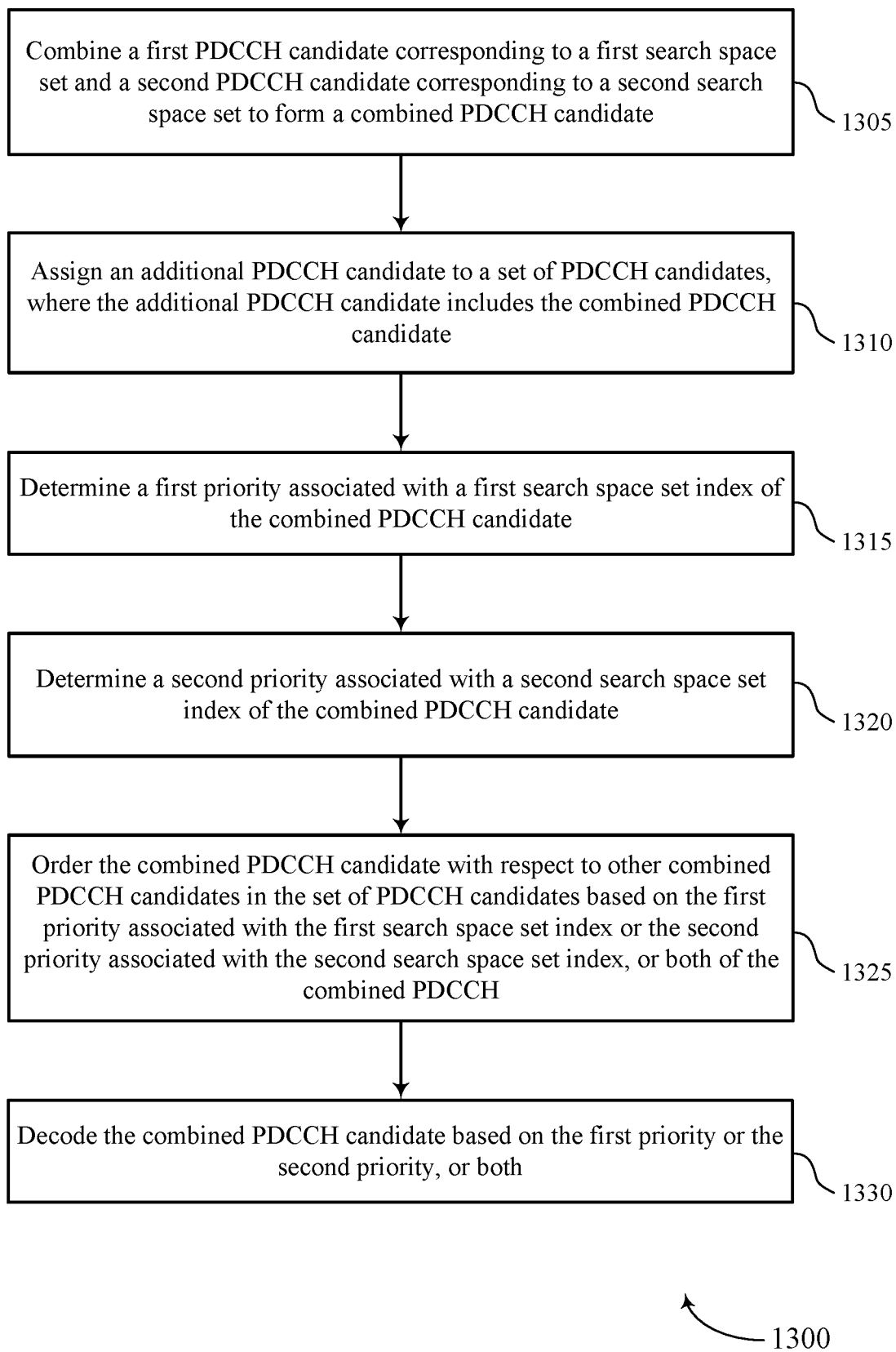

FIG. 13 shows a flowchart illustrating a method 1300 that supports PDCCH candidates related to PDCCH repetitions in accordance with aspects of the present disclosure. The operations of method 1300 may be implemented by a UE 115 or its components as described herein. For example, the operations of method 1300 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may combine a first PDCCH candidate corresponding to a first search space set and a second PDCCH candidate corresponding to a second search space set to form a combined PDCCH candidate. The operations of 1305 may be performed according to the methods described herein. In some examples, aspects of the operations of 1305 may be performed by a control channel component as described with reference to FIGS. 4 through 7.

At 1310, the UE may assign an additional PDCCH candidate to a set of PDCCH candidates, where the additional PDCCH candidate includes the combined PDCCH candidate. The operations of 1310 may be performed according to the methods described herein. In some examples, aspects of the operations of 1310 may be performed by a control channel component as described with reference to FIGS. 4 through 7.

At 1315, the UE may determine a first priority associated with a first search space set index of the combined PDCCH candidate. The operations of 1315 may be performed according to the methods described herein. In some examples, aspects of the operations of 1315 may be performed by an order component as described with reference to FIGS. 4 through 7.

At 1320, the UE may determine a second priority associated with a second search space set index of the combined PDCCH candidate. The operations of 1320 may be performed according to the methods described herein. In some examples, aspects of the operations of 1320 may be performed by an order component as described with reference to FIGS. 4 through 7.

At 1325, the UE may order the combined PDCCH candidate with respect to other combined PDCCH candidates in the set of PDCCH candidates based on the first priority associated with the first search space set index or the second priority associated with the second search space set index, or both of the combined PDCCH candidate. The operations of 1325 may be performed according to the methods described herein. In some examples, aspects of the operations of 1325 may be performed by an order component as described with reference to FIGS. 4 through 7.

At 1330, the UE may decode the combined PDCCH candidate based on the first priority or the second priority, or both. The operations of 1330 may be performed according to the methods described herein. In some examples, aspects of the operations of 1330 may be performed by a decode component as described with reference to FIGS. 4 through 7.

Figure 14:
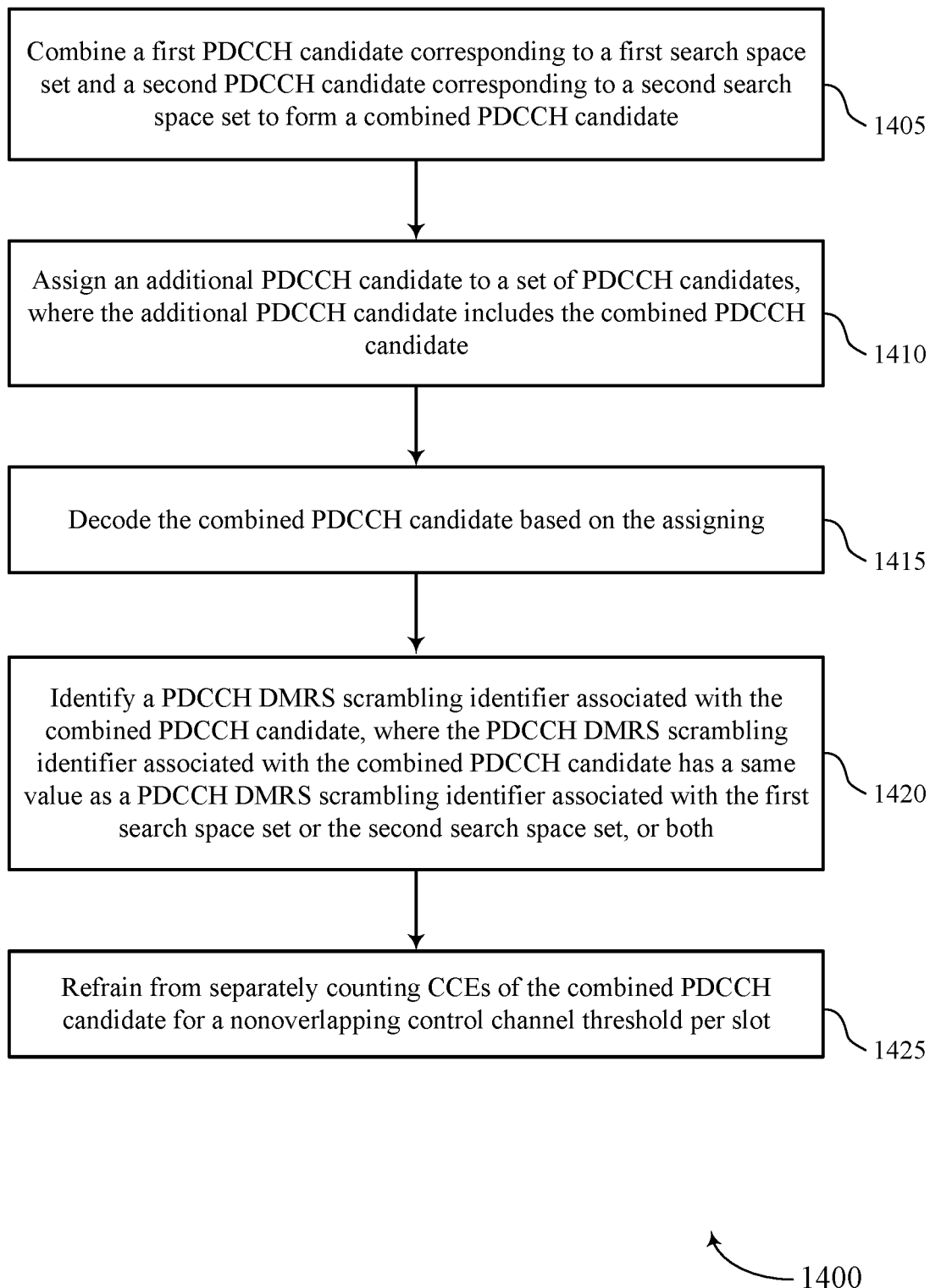

FIG. 14 shows a flowchart illustrating a method 1400 that supports PDCCH candidates related to PDCCH repetitions in accordance with aspects of the present disclosure. The operations of method 1400 may be implemented by a UE 115 or its components as described herein. For example, the operations of method 1400 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may combine a first PDCCH candidate corresponding to a first search space set and a second PDCCH candidate corresponding to a second search space set to form a combined PDCCH candidate. The operations of 1405 may be performed according to the methods described herein. In some examples, aspects of the operations of 1405 may be performed by a control channel component as described with reference to FIGS. 4 through 7.

At 1410, the UE may assign an additional PDCCH candidate to a set of PDCCH candidates, where the additional PDCCH candidate includes the combined PDCCH candidate. The operations of 1410 may be performed according to the methods described herein. In some examples, aspects of the operations of 1410 may be performed by a control channel component as described with reference to FIGS. 4 through 7.

At 1415, the UE may decode the combined PDCCH candidate based on the assigning. The operations of 1415 may be performed according to the methods described herein. In some examples, aspects of the operations of 1415 may be performed by a decode component as described with reference to FIGS. 4 through 7.

At 1420, the UE may identify a PDCCH DMRS scrambling identifier associated with the combined PDCCH candidate, where the PDCCH DMRS scrambling identifier associated with the combined PDCCH candidate has a same value as a PDCCH DMRS scrambling identifier associated with the first search space set or the second search space set, or both. The operations of 1420 may be performed according to the methods described herein. In some examples, aspects of the operations of 1420 may be performed by an identifier component as described with reference to FIGS. 4 through 7.

At 1425, the UE may refrain from separately counting CCEs of the combined PDCCH candidate for a nonoverlapping control channel threshold per slot. The operations of 1425 may be performed according to the methods described herein. In some examples, aspects of the operations of 1425 may be performed by an identifier component as described with reference to FIGS. 4 through 7.

Figure 15:
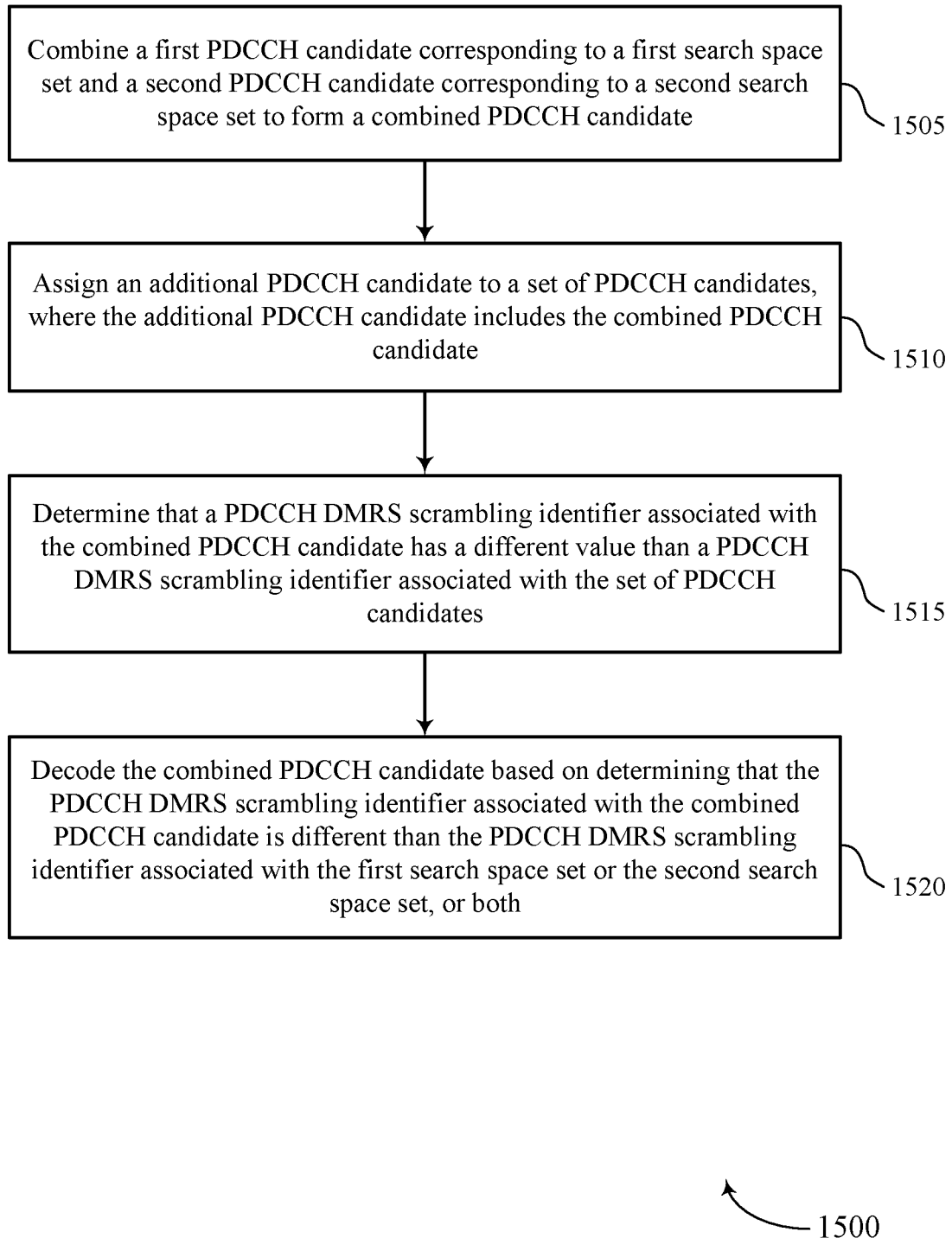

FIG. 15 shows a flowchart illustrating a method 1500 that supports PDCCH candidates related to PDCCH repetitions in accordance with aspects of the present disclosure. The operations of method 1500 may be implemented by a UE 115 or its components as described herein. For example, the operations of method 1500 may be performed by a UE communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may combine a first PDCCH candidate corresponding to a first search space set and a second PDCCH candidate corresponding to a second search space set to form a combined PDCCH candidate. The operations of 1505 may be performed according to the methods described herein. In some examples, aspects of the operations of 1505 may be performed by a control channel component as described with reference to FIGS. 4 through 7.

At 1510, the UE may assign an additional PDCCH candidate to a set of PDCCH candidates, where the additional PDCCH candidate includes the combined PDCCH candidate. The operations of 1510 may be performed according to the methods described herein. In some examples, aspects of the operations of 1510 may be performed by a control channel component as described with reference to FIGS. 4 through 7.

At 1515, the UE may determine that a PDCCH DMRS scrambling identifier associated with the combined PDCCH candidate has a different value than a PDCCH DMRS scrambling identifier associated with the set of PDCCH candidates. The operations of 1515 may be performed according to the methods described herein. In some examples, aspects of the operations of 1515 may be performed by an identifier component as described with reference to FIGS. 4 through 7.

At 1520, the UE may decode the combined PDCCH candidate based on determining that the PDCCH DMRS scrambling identifier associated with the combined PDCCH candidate is different than the PDCCH DMRS scrambling identifier associated with the first search space set or the second search space set, or both. The operations of 1520 may be performed according to the methods described herein. In some examples, aspects of the operations of 1520 may be performed by an identifier component as described with reference to FIGS. 4 through 7.

Figure 16:
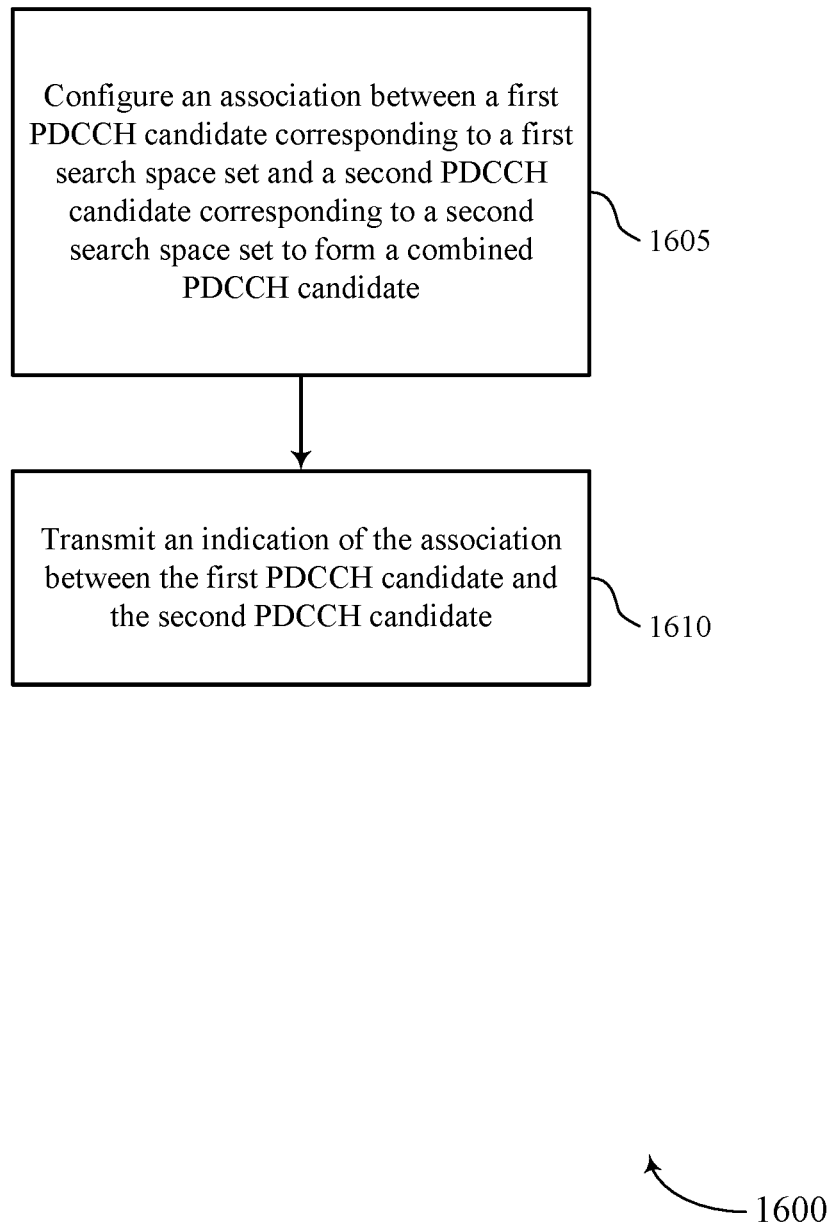

FIG. 16 shows a flowchart illustrating a method 1600 that supports PDCCH candidates related to PDCCH repetitions in accordance with aspects of the present disclosure. The operations of method 1600 may be implemented by a base station 105 or its components as described herein. For example, the operations of method 1600 may be performed by a base station communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may configure an association between a first PDCCH candidate corresponding to a first search space set and a second PDCCH candidate corresponding to a second search space set to form a combined PDCCH candidate. The operations of 1605 may be performed according to the methods described herein. In some examples, aspects of the operations of 1605 may be performed by a configuration component as described with reference to FIGS. 8 through 11.

At 1610, the base station may transmit an indication of the association between the first PDCCH candidate and the second PDCCH candidate. The operations of 1610 may be performed according to the methods described herein. In some examples, aspects of the operations of 1610 may be performed by a message component as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   combining a first physical downlink control channel candidate corresponding to a first search space set and a second physical downlink control channel candidate corresponding to a second search space set to form a combined physical downlink control channel candidate based at least in part on a capability of the UE associated with supporting physical downlink control channel repetition, wherein a maximum combined total of physical downlink control channel candidates corresponding to a set of downlink serving cells with a subcarrier spacing configuration for carrier aggregation based at least in part on the capability of the UE;
   identifying a first pool index configuration associated with a first control resource set corresponding to the first search space set and a second pool index configuration associated with a second control resource set corresponding to the second search space set, wherein the first pool index configuration and the second pool index configuration comprise a same value;
   assigning an additional physical downlink control channel candidate to a set of physical downlink control channel candidates, wherein the additional physical downlink control channel candidate comprises the combined physical downlink control channel candidate; and
   monitoring the combined physical downlink control channel candidate based at least in part on the assigning and on the first pool index configuration and the second pool index configuration comprising the same value.

2. The method of claim 1, further comprising:
   determining that the set of physical downlink control channel candidates including the additional physical downlink control channel candidate, the first physical downlink control channel candidate, and the second physical downlink control channel candidate, satisfies a threshold, the threshold comprising a threshold number of physical downlink control channel candidates within a time interval,
   wherein monitoring the combined physical downlink control channel candidate is based at least in part on the set of physical downlink control channel candidates including the additional physical downlink control channel candidate satisfying the threshold.

3. The method of claim 1, further comprising:
   determining the first control resource set associated with the first search space set; and
   determining a threshold for physical downlink control channel candidates associated with the first pool index configuration.

4. The method of claim 3, further comprising:
   determining the second control resource set associated with the second search space set; and
   determining a threshold for physical downlink control channel candidates associated with the second pool index configuration.

5. The method of claim 4, further comprising:
   determining that the first pool index configuration is different than the second pool index configuration; and
   assigning the additional physical downlink control channel candidate to the first pool index configuration, or the second pool index configuration, or both, wherein monitoring the combined physical downlink control channel candidate is based at least in part on that the first pool index configuration is different than the second pool index configuration.

6. The method of claim 4, further comprising:
   determining that the first pool index configuration and the second pool index configuration comprise the same value; and
   assigning the additional physical downlink control channel candidate to the first pool index configuration associated with the first control resource set or the second pool index configuration associated with the second control resource set.

7. The method of claim 4, further comprising:
   identifying that the UE is configured with a number of physical downlink control channel candidates in the set of physical downlink control channel candidates including the additional physical downlink control channel candidate; and
   determining that the number of physical downlink control channel candidates satisfies a threshold number of blind decoding physical downlink control channel candidates for a primary serving cell or a threshold number of control channel elements for the primary serving cell, or both,
   wherein monitoring the combined physical downlink control channel candidate is based at least in part on the number of physical downlink control channel candidates satisfying the threshold number of blind decoding physical downlink control channel candidates for the primary serving cell or the threshold number of control channel elements for the primary serving cell, or both.

8. The method of claim 7, further comprising:
   identifying blind decoding physical downlink control channel candidates in the set of physical downlink control channel candidates or control channel elements in the set of physical downlink control channel candidates, or both associated with a common search space set; and
   excluding the blind decoding physical downlink control channel candidates, or the control channel elements, or both associated with the common search space set from the threshold number of blind decoding physical downlink control channel candidates for the primary serving cell or the threshold number of control channel elements for the primary serving cell, or both.

9. The method of claim 8, further comprising:
   identifying a UE-specific search space set associated with a lowest search space index; and identifying a number of blind decoding physical downlink control channel candidates or a number of control channel elements, or both associated with the UE-specific search space set, wherein monitoring the combined physical downlink control channel candidate is based at least in part on the number of blind decoding physical downlink control channel candidates or the number of control channel elements, or both associated with the UE-specific search space set.

10. The method of claim 9, further comprising:
determining a remainder of physical downlink control channel candidates in the set of physical downlink control channel candidates based at least in part on the excluding;
determining a difference between the remainder of physical downlink control channel candidates and the number of blind decoding physical downlink control channel candidates associated with the UE-specific search space set; and
allocating the remainder of physical downlink control channel candidates and applying the number of blind decoding physical downlink control channel candidates associated with the UE-specific search space set to the threshold number of blind decoding physical downlink control channel candidates for the primary serving cell.

11. The method of claim 7, further comprising:
determining that the first pool index configuration associated with the first control resource set is different than the second pool index configuration associated with the second control resource set;
determining that the combined physical downlink control channel candidate is for a UE-specific search space associated with the primary serving cell, wherein the combined physical downlink control channel candidate is allocated to the UE based at least in part on determining that the first pool index configuration is different than the second pool index configuration and that the combined physical downlink control channel candidate is for a UE-specific search space; and
applying the combined physical downlink control channel candidate to the threshold number of blind decoding physical downlink control channel candidates for the primary serving cell, wherein the combined physical downlink control channel candidate is counted for overbooking of physical downlink control channel candidates for the primary serving cell and satisfies a threshold number of physical downlink control channel candidates for the primary serving cell, wherein monitoring the combined physical downlink control channel candidate is based at least in part on the applying.

12. The method of claim 7, further comprising:
determining that the first pool index configuration associated with the first control resource set and the second pool index configuration associated with the second control resource set have a same pool index configuration; and
determining that the combined physical downlink control channel candidate is for a UE-specific search space associated with the primary serving cell, wherein monitoring the combined physical downlink control channel candidate is based at least in part on the UE-specific search space associated with the primary serving cell.

13. The method of claim 12, further comprising:
excluding the combined physical downlink control channel candidate from the threshold number of blind decoding physical downlink control channel candidates for the primary serving cell based at least in part on one or more of that the first pool index configuration associated with the first control resource set and the second pool index configuration associated with the second control resource set have the same pool index configuration, or that the combined physical downlink control channel candidate is for the UE-specific search space associated with the primary serving cell, or both, wherein the combined physical downlink control channel candidate is not counted for overbooking of physical downlink control channel candidates for the primary serving cell.

14. The method of claim 1, further comprising:
ordering jointly the combined physical downlink control channel candidate and one or more physical downlink control channel candidates in the set of physical downlink control channel candidates based at least in part on corresponding search space set indices associated with the combined physical downlink control channel candidate and search space set indices associated with the one or more physical downlink control channel candidates in the set of physical downlink control channel candidates.

15. The method of claim 14, wherein the search space set indices associated with the combined physical downlink control channel candidate have a higher priority than the search space set indices associated with the one or more physical downlink control channel candidates.

16. The method of claim 1, further comprising:
determining a first priority associated with a first search space set index of the combined physical downlink control channel candidate;
determining a second priority associated with a second search space set index of the combined physical downlink control channel candidate;
determining a sum of the first search space set index and the second search space set index of the combined physical downlink control channel candidate;
determining that the first search space set index or the second search space set index is a lowest or a highest search space set index of a set of search space set indices; and
ordering the combined physical downlink control channel candidate with respect to other combined physical downlink control channel candidates in the set of physical downlink control channel candidates based at least in part on the first priority associated with the first search space set index, the second priority associated with the second search space set index, the lowest or the highest search space set index of the combined physical downlink control channel candidate, the sum of the first search space set index and the second search space set index, or any combination thereof,
wherein monitoring the combined physical downlink control channel candidate is based at least in part on the first priority, the second priority, the ordering, or any combination thereof.

17. The method of claim 1, wherein the combined physical downlink control channel candidate is defined over one or more search space indices of a set of search space set indices.

18. The method of claim 1, further comprising:
ordering the combined physical downlink control channel candidate based at least in part on a sum of search space indices of the combined physical downlink control channel candidate.

19. The method of claim 1, further comprising:
identifying a physical downlink control channel demodulation reference signal scrambling identifier associated with the combined physical downlink control channel candidate; and
refraining from separately counting control channel elements of the combined physical downlink control channel candidate for a nonoverlapping control channel threshold per slot,
wherein the physical downlink control channel demodulation reference signal scrambling identifier associated with the combined physical downlink control channel candidate has a same value as a physical downlink control channel demodulation reference signal scrambling identifier associated with the first search space set, or the second search space set, or both.

20. The method of claim 1, further comprising:
determining that a physical downlink control channel demodulation reference signal scrambling identifier associated with the combined physical downlink control channel candidate has a different value than a physical downlink control channel demodulation reference signal scrambling identifier associated with the first search space set or the second search space set, or both,
wherein monitoring the combined physical downlink control channel candidate is based at least in part on the determining.

21. The method of claim 1, further comprising:
separately counting control channel elements of the combined physical downlink control channel candidate for a nonoverlapping control channel threshold per slot.

22. The method of claim 1, wherein:
a threshold number of combined physical downlink control channel candidates within a time interval is based at least in part on the capability of the UE; and
the threshold number of combined physical downlink control channel candidates are per slot or physical downlink control channel span.

23. A method for wireless communication at a network entity, comprising:
configuring an association between a first physical downlink control channel candidate corresponding to a first search space set and a second physical downlink control channel candidate corresponding to a second search space set to form a combined physical downlink control channel candidate based at least in part on a capability of a UE associated with supporting physical downlink control channel repetition, a maximum combined total of physical downlink control channel candidates corresponding to a set of downlink serving cells with a subcarrier spacing configuration for carrier aggregation based at least in part on the capability of the UE, wherein a first pool index configuration associated with a first control resource set corresponding to the first search space set and a second pool index configuration associated with a second control resource set corresponding to the second search space set comprise a same value; and
transmitting, to the UE, an indication of the association between the first physical downlink control channel candidate and the second physical downlink control channel candidate.

24. The method of claim 23, further comprising:
configuring a priority between the first physical downlink control channel candidate corresponding to the first search space set and the second physical downlink control channel candidate corresponding to the second search space set; and
transmitting a second indication of the priority between the first physical downlink control channel candidate corresponding to the first search space set and the second physical downlink control channel candidate corresponding to the second search space set.

25. The method of claim 23, further comprising:
allocating physical downlink control channel candidates to a set of physical downlink control channel candidates; and
transmitting a second indication of the physical downlink control channel candidates of the set of physical downlink control channel candidates.

26. The method of claim 23, further comprising:
receiving the capability of the UE;
configuring a threshold number of combined physical downlink control channel candidates within a time interval based at least in part on the capability of the UE, wherein the threshold number of combined physical downlink control channel candidates within the time interval is per slot or physical downlink control channel span; and
transmitting a second indication of the threshold number of combined physical downlink control channel candidates.

27. The method of claim 23, wherein the first pool index configuration is different from the second pool index configuration.

28. An apparatus for wireless communication, comprising:
a processor,
memory coupled with the processor; and
instructions stored in the memory and executable by the processor to cause the apparatus to:
combine a first physical downlink control channel candidate corresponding to a first search space set and a second physical downlink control channel candidate corresponding to a second search space set to form a combined physical downlink control channel candidate based at least in part on a capability of the apparatus associated with supporting physical downlink control channel repetition, a maximum combined total of physical downlink control channel candidates corresponding to a set of downlink serving cells with a subcarrier spacing configuration for carrier aggregation based at least in part on the capability of the apparatus;
identify a first pool index configuration associated with a first control resource set corresponding to the first search space set and a second pool index configuration associated with a second control resource set corresponding to the second search space set, wherein the first pool index configuration and the second pool index configuration comprise a same value;
assign an additional physical downlink control channel candidate to a set of physical downlink control channel candidates, wherein the additional physical downlink control channel candidate comprises the combined physical downlink control channel candidate; and
decode the combined physical downlink control channel candidate based at least in part on the assigning and on the first pool index configuration and the second pool index configuration comprising the same value.

29. An apparatus for wireless communication, comprising:
a processor;
memory coupled with the processor; and
instructions stored in the memory and executable by the processor to cause the apparatus to:
configure an association between a first physical downlink control channel candidate corresponding to a first search space set and a second physical downlink control channel candidate corresponding to a second search space set to form a combined physical downlink control channel candidate based at least in part on a capability of a user equipment (UE) associated with supporting physical downlink control channel repetition, a maximum combined total of physical downlink control channel candidates corresponding to a set of downlink serving cells with a subcarrier spacing configuration for carrier aggregation based at least in part on the capability of the UE, wherein a first pool index configuration associated with a first control resource set corresponding to the first search space set and a second pool index configuration associated with a second control resource set corresponding to the second search space set comprise a same value; and
transmit an indication of the association between the first physical downlink control channel candidate and the second physical downlink control channel candidate.

30. The apparatus of claim 28, wherein the instructions are further executable by the processor to cause the apparatus to:
determine that the set of physical downlink control channel candidates including the additional physical downlink control channel candidate, the first physical downlink control channel candidate, and the second physical downlink control channel candidate, satisfy a threshold, the threshold comprising a threshold number of physical downlink control channel candidates within a time interval,
wherein decoding the combined physical downlink control channel candidate is based at least in part on the set of physical downlink control channel candidates including the additional physical downlink control channel candidate satisfying the threshold.

* * * * *